US012589804B2

(12) United States Patent
Hiei

(10) Patent No.: US 12,589,804 B2
(45) Date of Patent: ***Mar. 31, 2026

(54) VEHICLE PARKING ASSIST APPARATUS

(71) Applicant: TOYOTA JIDOSHA KABUSHIKI KAISHA, Toyota (JP)

(72) Inventor: Yu Hiei, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/771,546

(22) Filed: Jul. 12, 2024

(65) Prior Publication Data

US 2024/0367720 A1     Nov. 7, 2024

Related U.S. Application Data

(63) Continuation of application No. 18/336,205, filed on Jun. 16, 2023, now Pat. No. 12,071,173, which is a (Continued)

(30) Foreign Application Priority Data

Oct. 11, 2019    (JP) ................................. 2019-187980

(51) Int. Cl.
  *B62D 15/02*       (2006.01)
  *B60W 30/06*       (2006.01)
  (Continued)

(52) U.S. Cl.
  CPC ......... *B62D 15/0285* (2013.01); *B60W 30/06* (2013.01); *B62D 15/028* (2013.01);
  (Continued)

(58) Field of Classification Search
  CPC .... B62D 15/0285; B62D 15/028; G06T 7/12; G06T 7/74; G06T 2207/10152;
  (Continued)

(56) References Cited

U.S. PATENT DOCUMENTS 10,155,476 B2    12/2018 Kim
10,268,201 B2    4/2019 Iwama et al.
(Continued)

FOREIGN PATENT DOCUMENTS

CN        101573257 A     11/2009
CN        110312912 A     10/2019
(Continued)

OTHER PUBLICATIONS

Kazuki Yamamoto et al. "Proposal of an Environmental Recognition Method for Automatic Parking by an Image-based CNN", International Conference on Mechatronics and Automation, IEEE, 2019, pp. 833-838 (6 pages total).

(Continued)

*Primary Examiner* — Chico A Foxx
(74) *Attorney, Agent, or Firm* — Sughrue Mion, PLLC

(57)                ABSTRACT

A vehicle parking assist apparatus acquires a camera image when the vehicle stops by a non-determined parking lot and acquires feature points of a ground of an entrance of the non-determined parking lot as non-compared entrance feature points from the camera image. The vehicle parking assist apparatus determines whether the non-determined parking lot is a registered parking lot by comparing information on the non-compared entrance feature points with registered entrance feature point information. The vehicle parking assist apparatus executes a parking assist control with using the currently-acquired parking lot information and the registered parking lot information when the vehicle parking assist apparatus determines that the non-determined parking lot is the registered parking lot.

9 Claims, 23 Drawing Sheets

Related U.S. Application Data continuation of application No. 17/886,904, filed on Aug. 12, 2022, now Pat. No. 11,718,343, which is a continuation of application No. 16/939,564, filed on Jul. 27, 2020, now Pat. No. 11,458,961.

(51) Int. Cl.

| | |
|---|---|
| *G06T 7/12* | (2017.01) |
| *G06T 7/73* | (2017.01) |
| *G06V 10/44* | (2022.01) |
| *G06V 20/58* | (2022.01) |
| *G08G 1/16* | (2006.01) |

(52) U.S. Cl.
CPC .................. *G06T 7/12* (2017.01); *G06T 7/74* (2017.01); *G06V 20/586* (2022.01); *G08G 1/168* (2013.01); *G06T 2207/10152* (2013.01); *G06T 2207/30264* (2013.01); *G06V 10/44* (2022.01); *G06V 20/58* (2022.01)

(58) Field of Classification Search
CPC ........ G06T 2207/30264; G06V 20/586; G06V 20/58; G06V 10/44; B60W 30/06; G08G 1/168
See application file for complete search history.

(56) References Cited

U.S. PATENT DOCUMENTS

| | | | |
|---|---|---|---|
| 10,953,870 B2 | 3/2021 | Park et al. | |
| 10,988,136 B2 | 4/2021 | Kato et al. | |
| 11,091,155 B2 | 8/2021 | Suzuki et al. | |
| 11,117,570 B1 | 9/2021 | Broggi | |
| 11,458,961 B2 | 10/2022 | Hiei | |
| 11,718,343 B2 | 8/2023 | Hiei | |
| 12,254,701 B2 * | 3/2025 | Miyamoto | G06V 20/58 |
| 2007/0097209 A1 | 5/2007 | Kubota | |
| 2009/0153362 A1 | 6/2009 | Goto et al. | |
| 2009/0207045 A1 | 8/2009 | Jung | |
| 2009/0281725 A1 | 11/2009 | Sakata | |
| 2010/0066515 A1 | 3/2010 | Shimazaki et al. | |
| 2011/0216194 A1 | 9/2011 | Kosaki | |
| 2011/0298926 A1 | 12/2011 | Katsunaga et al. | |
| 2013/0162825 A1 | 6/2013 | Yoon | |
| 2014/0055615 A1 | 2/2014 | Chen | |
| 2014/0347485 A1 | 11/2014 | Zhang | |

| | | | |
|---|---|---|---|
| 2017/0029028 A1 | 2/2017 | Kiyokawa | |
| 2017/0206785 A1 | 7/2017 | Kim et al. | |
| 2017/0324948 A1 | 11/2017 | Lin | |
| 2018/0246515 A1 | 8/2018 | Iwama et al. | |
| 2019/0005824 A1 | 1/2019 | Hall et al. | |
| 2019/0039605 A1 | 2/2019 | Iio et al. | |
| 2019/0220997 A1 | 7/2019 | Asai et al. | |
| 2020/0380713 A1 | 12/2020 | Choi | |
| 2022/0237927 A1 | 7/2022 | Hiei et al. | |
| 2022/0379880 A1 | 12/2022 | Hiei | |
| 2023/0005277 A1 | 1/2023 | Ge | |
| 2023/0138464 A1 | 5/2023 | Gribko | |

FOREIGN PATENT DOCUMENTS

| | | | | | |
|---|---|---|---|---|---|
| CN | 114435348 A | * | 5/2022 | ............ | B60W 30/06 |
| CN | 119261940 A | * | 1/2025 | .............. | B60R 1/22 |
| JP | 2006-151370 A | | 6/2006 | | |
| JP | 2006-298115 A | | 11/2006 | | |
| JP | 2007-124226 A | | 5/2007 | | |
| JP | 2008-158958 A | | 7/2008 | | |
| JP | 2017-138664 A | | 8/2017 | | |
| JP | 2018-127065 A | | 8/2018 | | |
| JP | 2019089476 A | * | 6/2019 | | |
| JP | 2019-132664 A | | 8/2019 | | |
| WO | 2008/081655 A1 | | 7/2008 | | |
| WO | 2018/033424 A1 | | 2/2018 | | |

OTHER PUBLICATIONS

U.S. Appl. No. 17/886,904, filed Aug. 12, 2022.

Office Action issued by the U.S. Patent Office dated Mar. 31, 2023 in U.S. Appl. No. 17/553,996.

Office Action issued by the U.S. Patent Office dated Dec. 5, 2022 in U.S. Appl. No. 17/886,904.

Notice of Allowance issued by the U.S. Patent Office dated Mar. 17, 2023 in U.S. Appl. No. 17/886,904.

Notice of Allowance issued Jul. 12, 2023 in U.S. Appl. No. 17/553,996.

Notice of Allowance issued Aug. 31, 2023 in U.S. Appl. No. 17/553,996.

Office Action issued by the U.S. Patent Office dated Jan. 18, 2024 in U.S. Appl. No. 18/336,205.

Notice of Allowance issued Apr. 18, 2024 in U.S. Appl. No. 18/336,205.

Notice of Allowance issued Jun. 17, 2024 in U.S. Appl. No. 18/336,205.

* cited by examiner

VEHICLE PARKING ASSIST APPARATUS

CROSS-REFERENCE TO RELATED APPLICATIONS

This application is a Continuation of U.S. application Ser. No. 18/336,205, filed Jun. 16, 2023, (allowed), which is a Continuation of U.S. application Ser. No. 17/886,904, filed on Aug. 12, 2022, (now U.S. Pat. No. 11,718,343, issued on Aug. 8, 2023), which is a Continuation of U.S. application Ser. No. 16/939,564, filed on Jul. 27, 2020 (now U.S. Pat. No. 11,458,961 issued on Oct. 4, 2022), which claims priority from Japanese Patent Application No. 2019-187980, filed on Oct. 11, 2019, in the Japanese Intellectual Property Office, the disclosures of which are incorporated herein by reference in their entirety.

BACKGROUND

Field

The invention relates to a vehicle parking assist apparatus.

Description of the Related Art

There is known a vehicle parking assist apparatus which autonomously parks a vehicle in a parking lot without parking area lines such as white lines defining the parking areas. The parking lot without the parking area lines is, for example, a parking lot of a private house. The known vehicle parking assist apparatus registers parking lot information when the vehicle parking assist apparatus completes autonomously parking the vehicle. The parking lot information is information on the parking lot in which the vehicle has parked. As the known vehicle parking assist apparatus autonomously moves the vehicle to park the vehicle in the same parking lot in which the vehicle has been autonomously parked before, the vehicle parking assist apparatus periodically acquires the information on the parking lot. The vehicle parking assist apparatus to move and park the vehicle in the same parking lot with comparing the acquired information with the registered parking lot information and realizing a relationship in position between the vehicle and the parking lot. Such a vehicle parking assist apparatus is known, for example, in JP 2017-138664. The vehicle parking assist apparatus known in JP 2017-138664 acquires images of standing objects in and/or around the parking lot by a camera and registers features points of standing objects in the images the parking lot information.

A situation may occur that only a driver is in the vehicle when the feature points of the standing objects are registered, and thereafter one or more passengers in addition to the driver are in the vehicle when the vehicle is autonomously parked in the parking lot. In this situation, an inclination of the vehicle may vary between the time of the feature points being registered and the time of the vehicle being autonomously parked in the parking lot. Also, a situation may occur that an inclination of the ground on which the vehicle moves at the time of the vehicle being autonomously parked is different from the inclination of the ground on which the vehicle moves at the time of the feature points being registered. In this situation, the inclination of the vehicle may vary between the time of the vehicle being autonomously parked and the time of the feature points being registered. In these situations, a shape of the standing object in the camera image may vary between the time of the feature points being registered and the time of the vehicle being autonomously parked. In this case, it may not be possible to determine that the feature points acquired at the time of the vehicle being autonomously parked are the registered feature points of the standing object even when the acquired feature points are the registered feature points of the standing object. In this case, it may not be possible to autonomously park the vehicle in the parking lot.

Further, a situation may occur that the feature points are registered in the morning, and the vehicle is autonomously parked in the afternoon. In this situation, manners of the sunlight shining on the standing object directly and the sunlight shining reflected by the ground shining on the standing object vary between the time of the feature points being registered and the time of the vehicle being autonomously parked. Also, a situation may occur that the feature points are registered in the daytime, and the vehicle is autonomously parked in the night-time. In this situation, the manners of the sunlight shining on the standing object directly and the sunlight reflected by the ground shining on the standing object vary between the time of the feature points being registered and the time of the vehicle being autonomously parked. In these situations, the feature points of the standing object in the camera image may vary between the time of the feature points being registered and the time of the vehicle being autonomously parked. In this case, it may not be possible to determine that the feature points acquired at the time of the vehicle being autonomously parked are the registered feature points of the standing object even when the acquired feature points are the registered feature points of the standing object. In this case, it may not be possible to autonomously park the vehicle in the parking lot.

Further, a situation may occur that the feature points of the movable standing object such as a bicycle and a plant pot are registered as the parking lot information, and the movable standing object has been moved when the vehicle is autonomously parked. In this situation, the registered feature points of the movable standing object may not be acquired when the vehicle is autonomously parked. As a result, the vehicle may not be autonomously parked.

When the vehicle parking assist apparatus is configured to register the feature points of the standing object as the parking lot information as described above, the vehicle may not be autonomously parked in the parking lot when the situation surrounding the vehicle and the parking lot varies between the time of the feature points being registered and the time of the vehicle being autonomously parked.

SUMMARY

The invention has been made for solving problems described above. An object of the invention is to provide a vehicle parking assist apparatus which can park the vehicle 100 in the parking lot autonomously even when the situation surrounding the vehicle and the parking lot varies between the time of the feature points being registered and the time of the vehicle being autonomously parked.

According to the invention, a vehicle parking assist apparatus comprises at least one camera and an electronic control unit. The at least one camera is mounted on a vehicle to take images of views surrounding the vehicle. The electronic control unit can execute a parking assist control to autonomously park the vehicle in the parking lot with using information on the parking lot acquired as parking lot information from the image taken by the at least one camera.

The electronic control unit acquires the image of the parking lot taken by the at least one camera as a camera image when the vehicle stops by the parking lot. In addition, the electronic control unit acquires feature points of a ground of an entrance of the parking lot as entrance feature points from the camera image. In this case, the electronic control unit executes the parking assist control with using the parking lot information acquired from the currently-acquired camera image. In addition, the electronic control unit registers the parking lot information including information on the entrance feature points as entrance feature point information.

The electronic control unit acquires the camera image when the vehicle stops by a non-determined parking lot after the electronic control unit has registered the parking lot information. In addition, the electronic control unit acquires the feature points of the ground of the entrance of the non-determined parking lot as non-compared entrance feature points from the currently-acquired camera image. In this case, the electronic control unit determines whether the non-determined parking lot is a registered parking lot by comparing information on the non-compared entrance feature points with the entrance feature point information, the registered parking lot being the parking lot corresponding to the registered parking lot information. The electronic control unit executes the parking assist control with using the currently-acquired parking lot information and the registered parking lot information when the electronic control unit determines that the non-determined parking lot is the registered parking lot.

According to the invention, the information on the feature points in the camera image of the ground in and/or around the parking lot, not the feature points in the camera image of the standing object(s) in and/or around the parking lot, is registered as the entrance feature point information. The camera image of the ground in and/or around the parking lot varies to a small extent even if the situation surrounding the vehicle and/or the parking lot varies between the time of the entrance feature point information being registered and the time of the vehicle being autonomously moved and parked. Therefore, it is possible to determine whether the feature points acquired before the vehicle is autonomously moved and parked, are the feature points registered by the entrance feature point information even if the situation surrounding the vehicle and/or the parking lot varies between the time of the vehicle being autonomously moved and parked and the time of the entrance feature point information being registered. As a result, when the information acquired at the time of the entrance feature point information being registered, can be used to autonomously move and park the vehicle in the parking lot this time, it is possible to autonomously move and park the vehicle in the parking lot, using the information acquired at the time of the entrance feature point information being registered as well as the information acquired while the vehicle is autonomously moved. Thus, the vehicle can be autonomously and accurately parked in the parking lot.

According to an aspect of the invention, the electronic control unit may divide the camera image into predetermined divided areas. In addition, the electronic control unit may acquire the at least one feature point from each of the predetermined divided areas. In this case, the entrance feature points may be the feature points acquired from the predetermined divided areas.

According to this aspect of the invention, the entrance feature points are acquired evenly throughout the camera image of the entrance of the parking lot. Thus, it is possible to assuredly determines that the parking lot by which the vehicle stops is the registered parking lot when the vehicle stops by the parking lot registered as the registered parking lot.

According to another aspect of the invention, the predetermined divided areas may have the same sizes.

According to further another aspect of the invention, the predetermined divided areas may not overlap each other.

According to further another aspect of the invention, the electronic control unit may acquire the larger number of the entrance feature points from the predetermined divided area relatively near the middle of the entrance of the parking lot than the predetermined divided area relatively away from the middle of the entrance of the parking lot.

According to this aspect of the invention, the larger number of the entrance feature points are acquired from the camera image of the ground near the middle of the entrance of the parking lot. Thus, it is possible to assuredly determines that the parking lot by which the vehicle stops is the registered parking lot when the vehicle stops by the parking lot registered as the registered parking lot.

According to further another aspect of the invention, the electronic control unit may acquire a predetermined number of the entrance feature points from each of the predetermined divided areas. Further, the electronic control unit may acquire the larger number of the feature points from the predetermined divided area from which the electric control unit has acquired the predetermined number of the entrance feature points when the electronic control unit cannot acquire the predetermined number of the entrance feature points from one or more of the predetermined divided areas.

According to this aspect of the invention, even if the predetermined number of the entrance feature points cannot be acquired from one or more of the predetermined divided areas, it is possible to acquire the same or almost the same number of the entrance feature points as the total of all the predetermined numbers. Thus, it is possible to assuredly determines that the parking lot by which the vehicle stops is the registered parking lot when the vehicle stops by the parking lot registered as the registered parking lot.

According to further another aspect of the invention, the entrance feature point information may include information on a luminance pattern of each of the entrance feature points in the camera image.

According to this aspect of the invention, the luminance patterns are used to determine whether the parking lot by which the vehicle stops is the registered parking lot.

According to further another aspect of the invention, the entrance feature point information may include information on a position of each of the entrance feature points relative to a predetermined position in the parking lot.

According to this aspect of the invention, the positions of the entrance feature points relative to the predetermined position in the parking lot are used to determine whether the parking lot by which the vehicle stops is the registered parking lot.

According to further another aspect of the invention, the electronic control unit may execute the parking assist control with using the currently-acquired parking lot information when the electronic control unit determines that the non-determined parking lot is not the registered parking lot.

According to further another aspect of the invention, the at least one camera may include a front camera which takes the image of the view ahead of the vehicle, a rear camera which takes the image of the view behind the vehicle, a left camera which takes the image of the view at the left side of the vehicle, and a right camera which takes the image of the view at the right side of the vehicle.

According to further another aspect of the invention, the electronic control unit may execute the parking assist control with using the currently-acquired parking lot information when the electronic control unit determines that the non-determined parking lot is not the registered parking lot.

According to further another aspect of the invention, the at least one camera may include a front camera which takes the image of the view ahead of the vehicle, a rear camera which takes the image of the view behind the vehicle, a left camera which takes the image of the view at the left side of the vehicle, and a right camera which takes the image of the view at the right side of the vehicle.

Elements of the invention are not limited to elements of embodiments and modified examples of the invention described along with the drawings. The other objects, features and accompanied advantages of the invention can be easily understood from the embodiments and the modified examples of the invention.

BRIEF DESCRIPTION OF THE DRAWINGS

FIG. 7 is a view which shows a feature point.

FIG. 10A to FIG. 10C are views which show the displays.

DESCRIPTION OF THE PREFERRED EMBODIMENTS

Figure 1:
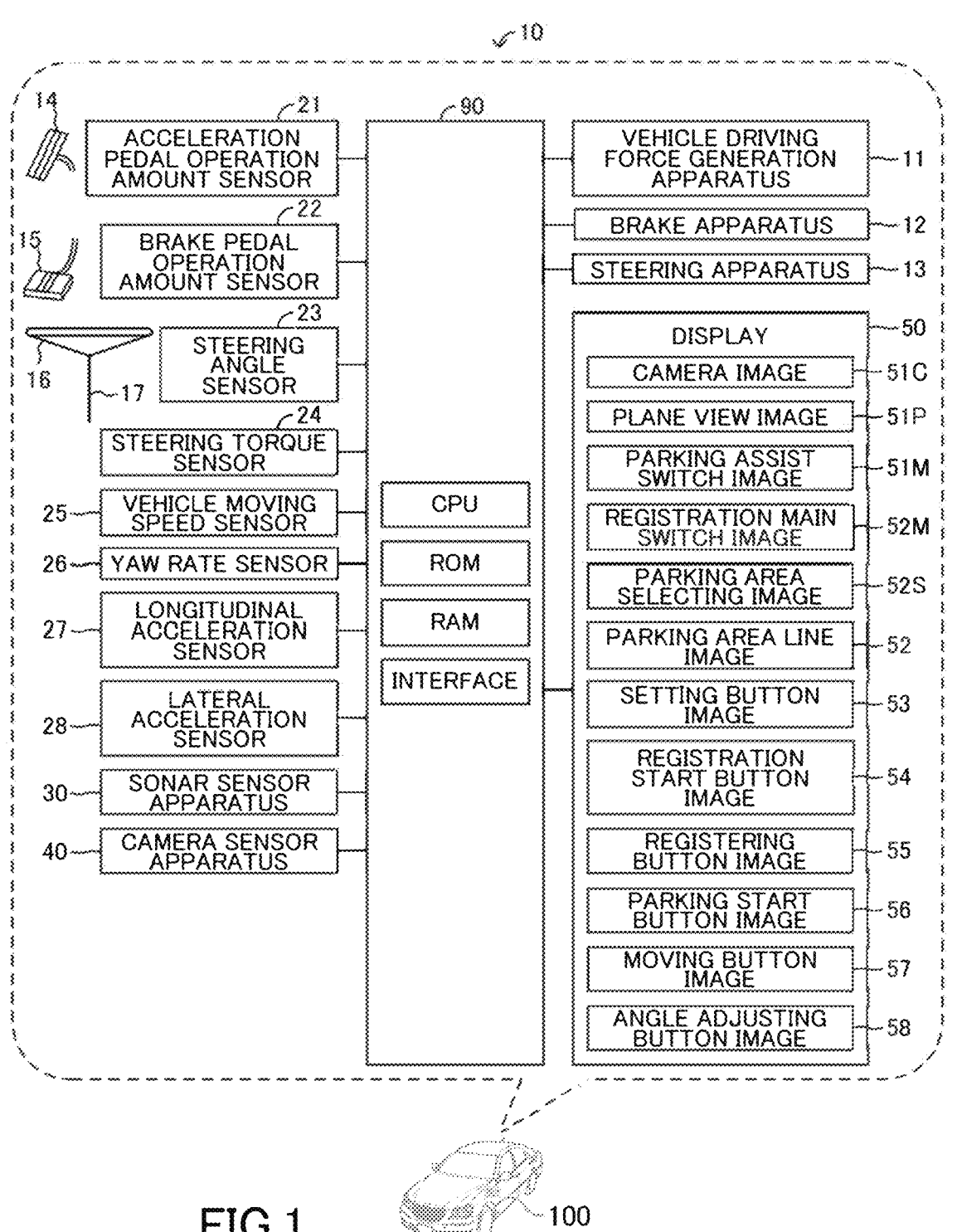
FIG. 1 is a view which shows a vehicle parking assist apparatus according to an embodiment of the invention and a vehicle to which the vehicle parking assist apparatus according to the embodiment of the invention is applied.

Below, a vehicle parking assist apparatus according to an embodiment of the invention will be described with reference to the drawings. FIG. 1 shows the vehicle parking assist apparatus 10 according to the embodiment of the invention and a vehicle 100 to which the vehicle parking assist apparatus 10 is applied.

As shown in FIG. 1, the vehicle parking assist apparatus 10 includes an ECU 90. ECU stands for electronic control unit. The ECU 90 includes a microcomputer as a main component. The microcomputer includes a CPU, a ROM, a RAM, a non-volatile memory, and an interface. The CPU is configured or programmed to realize various functions by executing instructions, programs, or routines memorized in the ROM.

The vehicle 100 is installed with a vehicle driving force generation apparatus 11, a brake apparatus 12, and a steering apparatus 13. The vehicle driving force generation apparatus 11 generates a driving force for driving the vehicle 100 and applies the driving force to wheels to be driven of the vehicle 100. The vehicle driving force generation apparatus 11 is, for example, an internal combustion engine and/or electric motor. The brake apparatus 12 applies braking forces to vehicle wheels of the vehicle 100 to brake the vehicle 100. The steering apparatus 13 applies a steering torque to wheels to be steered of the vehicle 100 to steer the vehicle 100.

The vehicle driving force generation apparatus 11, the brake apparatus 12, and the steering apparatus 13 are electrically connected to the ECU 90. The ECU 90 controls operations of the vehicle driving force generation apparatus 11 to control the driving force applied to the wheels to be driven of the vehicle 100. Further, the ECU 90 controls operations of the brake apparatus 12 to control the braking forces applied to the vehicle wheels of the vehicle 100. Further, the ECU 90 controls operations of the steering apparatus 13 to control the steering torque applied to the wheels to be steered of the vehicle 100.

<Sensors>

The vehicle parking assist apparatus 10 includes an acceleration pedal operation amount sensor 21, a brake pedal operation amount sensor 22, a steering angle sensor 23, a steering torque sensor 24, a vehicle moving speed sensor 25, a yaw rate sensor 26, a longitudinal acceleration sensor 27, a lateral acceleration sensor 28, a sonar sensor apparatus 30, a camera sensor apparatus 40, and a display 50.

The acceleration pedal operation amount sensor 21 is electrically connected to the ECU 90. The ECU 90 detects an amount AP of an operation applied to an acceleration pedal 14 by the acceleration pedal operation amount sensor 21 and acquires the amount AP as an acceleration pedal operation amount AP. The ECU 90 controls the operations of the vehicle driving force generation apparatus 11 to apply the driving force to the wheels to be driven of the vehicle 100 from the vehicle driving force generation apparatus 11, depending on the acquired acceleration pedal operation amount AP.

The brake pedal operation amount sensor 22 is electrically connected to the ECU 90. The ECU 90 detects an amount BP of an operation applied to a brake pedal 15 by the brake pedal operation amount sensor 22 and acquires the amount BP as a brake pedal operation amount BP. The ECU 90 controls the operations of the brake apparatus 12 to apply the braking forces to the vehicle wheels of the vehicle 100 from the brake apparatus 12, depending on the acquired brake pedal operation amount BP.

The steering angle sensor 23 is electrically connected to the ECU 90. The ECU 90 detects an angle θst of rotation of a steering wheel 16 relative to a center position by the steering angle sensor 23 and acquires the angle θst as a steering angle θst.

The steering torque sensor 24 is electrically connected to the ECU 90. The ECU 90 detects a torque TQst input to a steering shaft 17 by a driver of the vehicle 100 by the steering torque sensor 24 and acquires the torque TQst as a steering torque TQst.

The ECU 90 controls the operations of the steering apparatus 13 to apply the steering torque to the wheels to be steered of the vehicle 100 from the steering apparatus 13, depending on the acquired steering angle θst and the acquired steering torque TQst.

The vehicle moving speed sensor 25 is electrically connected to the ECU 90. The ECU 90 detects rotation speeds Vrot of the vehicle wheels of the vehicle 100 by the vehicle moving speed sensor 25 and acquires the rotation speeds Vrot of the vehicle wheels of the vehicle 100. The ECU 90 acquires a moving speed SPD of the vehicle 100 as a vehicle moving speed SPD, based on the acquired rotation speeds Vrot of the vehicle wheels of the vehicle 100.

The yaw rate sensor 26 is electrically connected to the ECU 90. The ECU 90 detects a yaw rate YR of the vehicle 100 by the yaw rate sensor 26 and acquires the yaw rate YR of the vehicle 100 as a vehicle yaw rate YR.

The longitudinal acceleration sensor 27 is electrically connected to the ECU 90. The ECU 90 detects a longitudinal acceleration Gx of the vehicle 100 by the longitudinal acceleration sensor 27 and acquires the longitudinal acceleration Gx as a vehicle longitudinal acceleration Gx.

The lateral acceleration sensor 28 is electrically connected to the ECU 90. The ECU 90 detects a lateral acceleration Gy of the vehicle 100 by the lateral acceleration sensor 28 and acquires the lateral acceleration Gy as a vehicle lateral acceleration Gy.

The sonar sensor apparatus 30 includes a first clearance sonar 301 to a twelfth clearance sonar 312.

Figure 2:
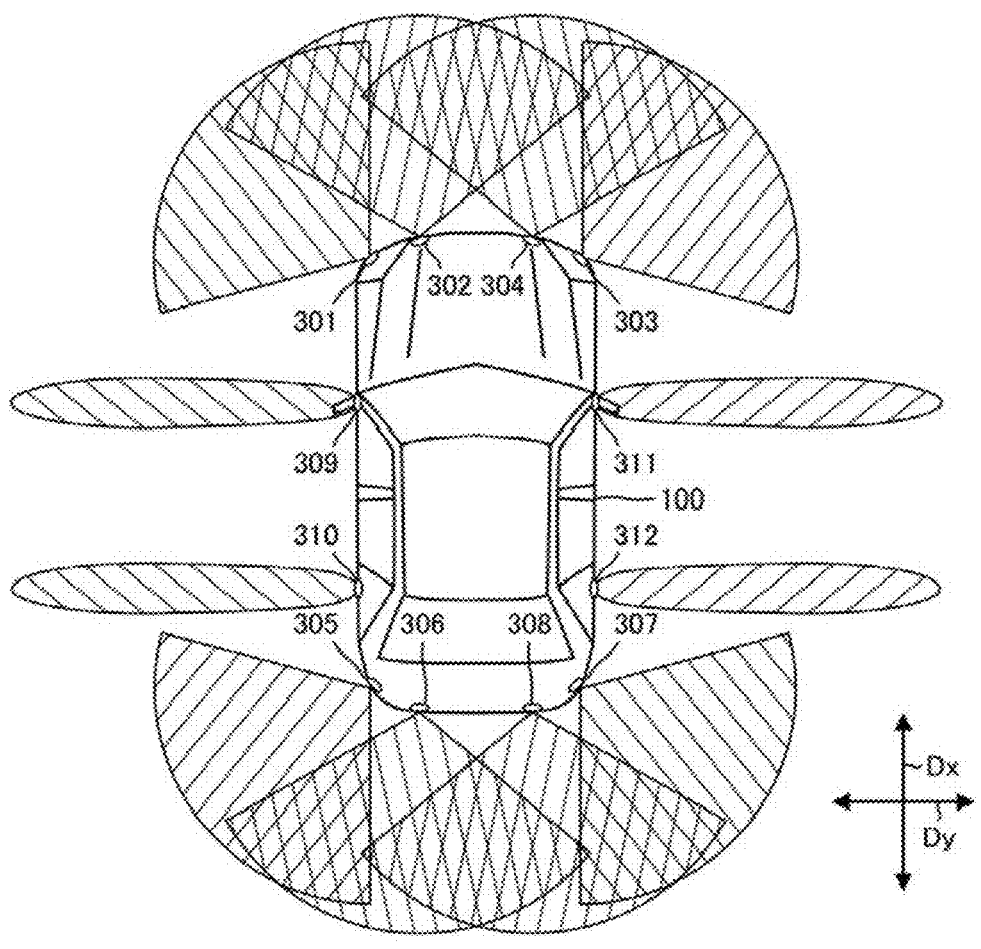
FIG. 2 is a view which shows a sonar sensor apparatus and detection ranges of the sonar sensor apparatus.

As shown in FIG. 2, the first clearance sonar 301 is mounted on a left end of a front end portion of the vehicle 100 to radiate sonic waves forward left. The second clearance sonar 302 is mounted on the front end portion of the vehicle 100 between the left end of the front end of the vehicle 100 and a center of the front end portion of the vehicle 100 to radiate the sonic waves forward straight. The third clearance sonar 303 is mounted on a right end of the front end portion of the vehicle 100 to radiate the sonic waves forward right. The fourth clearance sonar 304 is mounted on the front end portion of the vehicle 100 between the right end of the front end portion of the vehicle 100 and the center of the front end portion of the vehicle 100 to radiate the sonic waves forward straight.

The fifth clearance sonar 305 is mounted on a left end of a rear end portion of the vehicle 100 to radiate the sonic waves rearward left. The sixth clearance sonar 306 is mounted on the rear end portion of the vehicle 100 between the left end of the rear end portion of the vehicle 100 and a center of the rear end portion of the vehicle 100 to radiate the sonic waves rearward straight. The seventh clearance sonar 307 is mounted on a right end of the rear end portion of the vehicle 100 to radiate the sonic waves rearward right. The eighth clearance sonar 308 is mounted on the rear end portion of the vehicle 100 between the right end of the rear end portion of the vehicle 100 and the center of the rear end portion of the vehicle 100 to radiate the sonic waves rearward straight.

The ninth clearance sonar 309 is mounted on a front side of a left side portion of the vehicle 100 to radiate the sonic waves leftward straight. The tenth clearance sonar 310 is mounted on a rear side of the left side portion of the vehicle 100 to radiate the sonic waves leftward straight. The eleventh clearance sonar 311 is mounted on a front side of a right side portion of the vehicle 100 to radiate the sonic waves rightward straight. The twelfth clearance sonar 312 is mounted on a rear side of the right side portion of the vehicle 100 to radiate the sonic waves rightward straight.

The first clearance sonar 301 to the twelfth clearance sonar 312 receive the sonic waves reflected by objects.

The sonar sensor apparatus 30 is electrically connected to the ECU 90. The sonar sensor apparatus 30 sends information on (i) the sonic waves radiated from the first clearance sonar 301 to the twelfth clearance sonar 312 and (ii) the sonic waves received by the first clearance sonar 301 to the twelfth clearance sonar 312. The ECU 90 acquires information on the objects around the vehicle 100 as object information OBJ, based on the information sent from the sonar sensor apparatus 30. Hereinafter, the information sent from the sonar sensor apparatus 30 will be referred to as "the sonar information SON."

A direction Dx shown in FIG. 2 is a longitudinal direction of the vehicle 100. Hereinafter, the direction Dx will be referred to as "the vehicle longitudinal direction Dx." A direction Dw shown in FIG. 2 is a width direction of the vehicle 100. Hereinafter, the direction Dw will be referred to as "the vehicle width direction Dy."

The camera sensor apparatus 40 includes a front camera 41, a rear camera 42, a left camera 43, and a right camera 44. Hereinafter, the cameras 45 includes the front camera 41, the rear camera 42, the left camera 43, and the right camera 44.

Figure 3:
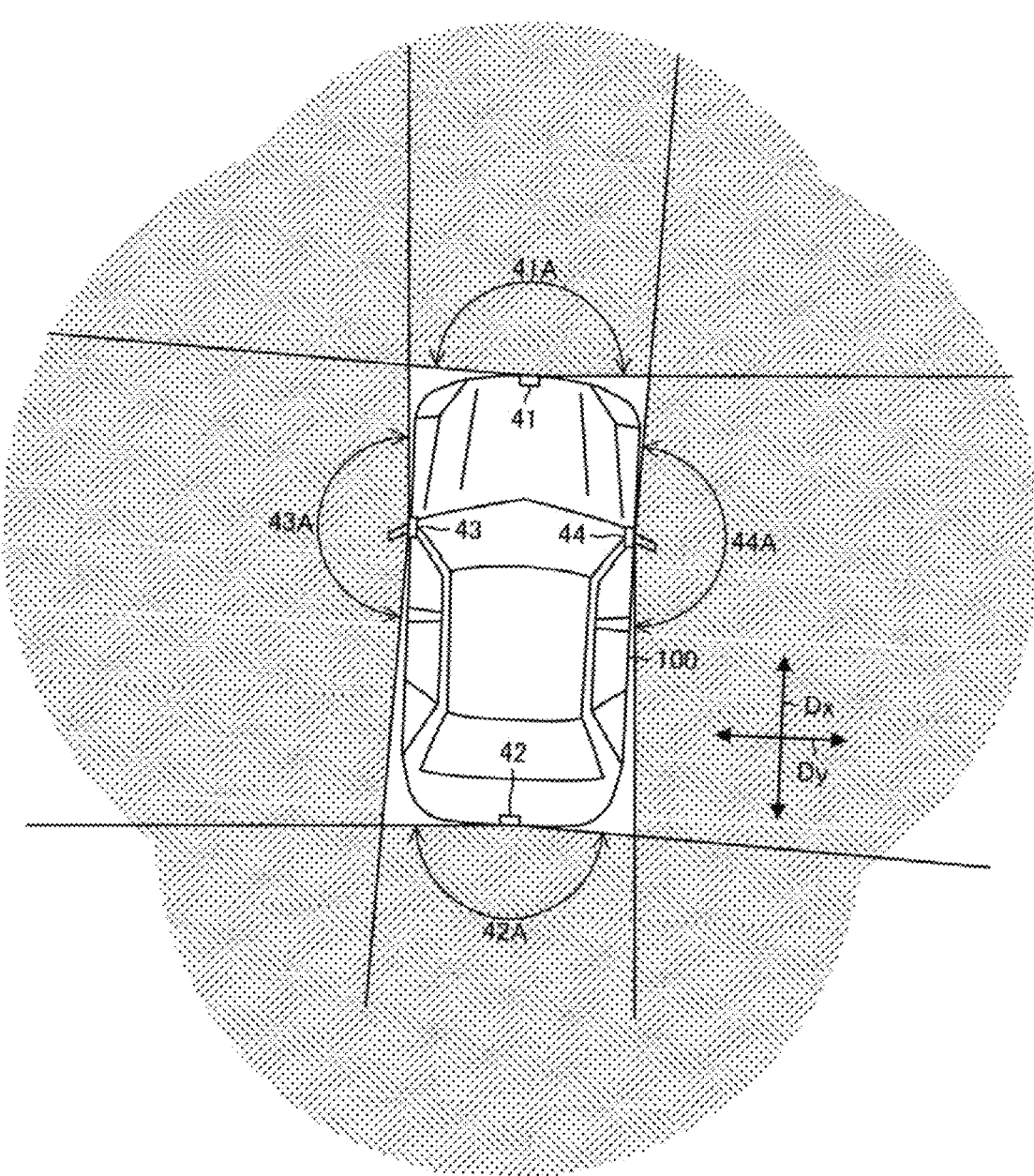
FIG. 3 is a view which shows a camera sensor apparatus and detection ranges of the camera sensor apparatus.

As shown in FIG. 3, the front camera 41 is mounted on the center of the front end portion of the vehicle 100 to take images of a view ahead of the vehicle 100. A field angle 41A of the front camera 41 is about 180 degrees. The rear camera 42 is mounted on the center of the rear end portion of the vehicle 100 to take images of a view behind the vehicle 100. A field angle 42A of the rear camera 42 is about 180 degrees. The left camera 43 is mounted on the left side portion of the vehicle 100 to take images of a view at the left of the vehicle 100. A field angle 43A of the left camera 43 is about 180 degrees. The right camera 44 is mounted on the right side portion of the vehicle 100 to take images of a view at the right of the vehicle 100. A field angle 44A of the right camera 44 is about 180 degrees.

The camera sensor apparatus 40 is electrically connected to the ECU 90. The ECU 90 acquires information on the images of the views taken by the cameras 45 of the camera sensor apparatus 40.

Hereinafter, the information on the images of the view taken by the front camera 41 will be referred to as "the front image information IMG1." Also, the information on the images of the view taken by the rear camera 42 will be referred to as "the rear image information IMG2." Also, the information on the images of the view taken by the left camera 43 will be referred to as "the left image information IMG3." Also, the information on the images of the view taken by the right camera 44 will be referred to as "the right image information IMG4." Further, the front image information IMG1, the rear image information IMG2, the left image information IMG3, and the right image information IMG4 will be collectively referred to as "the image information IMG."

The vehicle parking assist apparatus 10 acquires feature points F, based on the image information IMG when a predetermined condition becomes satisfied. The feature point F is a predetermined area of the image taken by each of the cameras 45 having a luminance level largely different from the luminance level of an area of the image surrounding the predetermined area.

Figure 4:
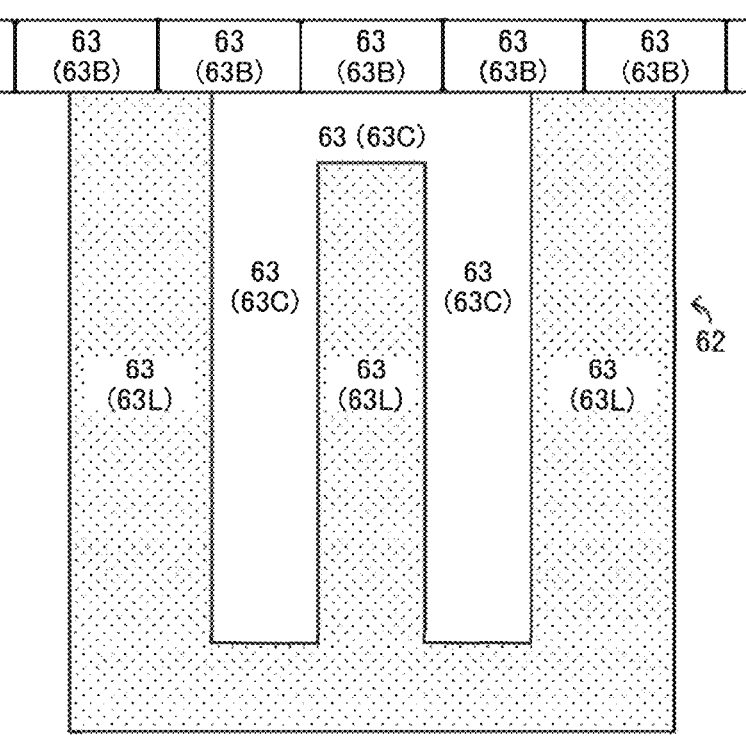
FIG. 4 is a view which shows an example of a parking lot.

For example, when the cameras 45 take the images of a parking lot 62 shown in FIG. 4, the acquired feature points F are corner portions of concrete blocks 63B, corner portions of the ground 63 of lawn 63L, and border portions between the ground 63 of the block 63B and the ground 63 of the lawn 63L.

The ground 63 of the parking lot 62 shown in FIG. 4 is formed by the ground 63 of concrete 63C and the ground 63 of the lawn 63L. Further, the concrete blocks 63B closing road gutters are provided alongside at an entrance 62ent of the parking lot 62. Therefore, the ground 63 of the entrance 62ent of the parking lot 62 is formed by surfaces of the blocks 63B.

Figure 5:
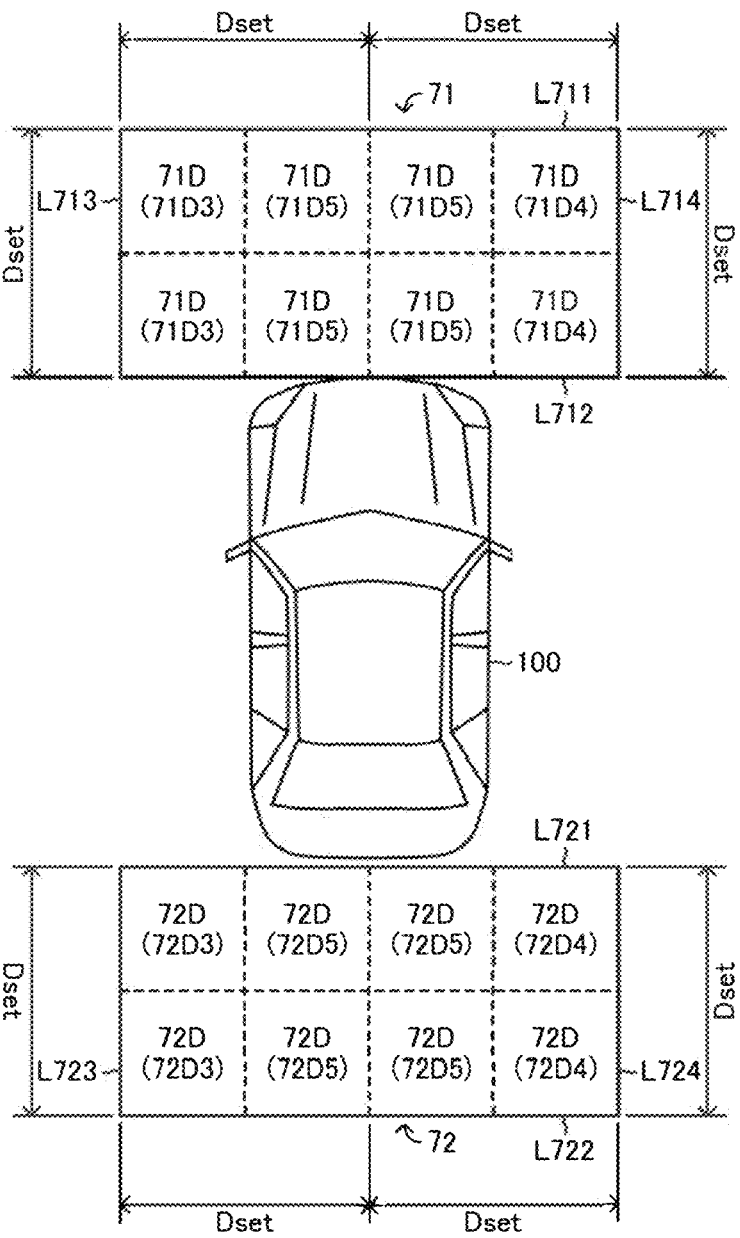
FIG. 5 is a view which shows a front area and a rear area.

The vehicle parking assist apparatus 10 acquires the feature points F in a predetermined area 71 of the ground 63 located on the front side of the vehicle 100, based on the front image information IMG1 (see FIG. 5). Hereinafter, the feature points F in the predetermined area 71 will be referred to as "the front feature points F." In addition, the vehicle parking assist apparatus 10 acquires the feature points F in a predetermined area 72 of the ground 63 located on the rear side of the vehicle 100, based on the rear image information IMG2 (see FIG. 5). Hereinafter, the feature points F in the predetermined area 72 will be referred to as "the rear feature points F." In addition, the vehicle parking assist apparatus 10 acquires the feature points F in a predetermined area 73 of the ground 63 located on the left side of the vehicle 100, based on the left image information IMG3 (see FIG. 6). Hereinafter, the feature points F in the predetermined area 73 will be referred to as "the left feature points F3." In addition, the vehicle parking assist apparatus 10 acquires the feature points F in a predetermined area 74 of the ground 63 located on the right side of the vehicle 100, based on the right image information IMG4 (see FIG. 6). Hereinafter, the feature points F in the predetermined area 74 will be referred to as "the right feature points F4."

As shown in FIG. 5, the predetermined area 71 is an area defined by a line L711, a line L712, a line L713, and a line L714. The line L711 extends parallel to the vehicle width direction Dy, passing through a point away forward from the front camera 41 by a predetermined distance Dset. The line L712 extends parallel to the vehicle width direction Dy, passing through the front camera 41. The line L713 extends parallel to the vehicle longitudinal direction Dx, passing through a point away leftward from the front camera 41 by the predetermined distance Dset. The line L714 extends parallel to the vehicle longitudinal direction Dx, passing through a point away rightward from the front camera 41 by the predetermined distance Dset. Hereinafter, the predetermined area 71 will be referred to as "the front area 71."

The front area 71 is quadrisected in the vehicle width direction Dy and bisected in the vehicle longitudinal direction Dx. Therefore, the front area 71 includes eight areas 71D. In other words, the front area 71 is divided into the eight areas 71D having the same sizes. Hereinafter, each of the areas 71D will be referred to as "the front divided area 71D." Further, each of two of the front divided areas 71D located at the left end of the front area 71 in the vehicle width direction Dy will be referred to as "the left end divided area 71D3." Further, each of two of the front divided areas 71D located at the right end of the front area 71 in the vehicle width direction Dy will be referred to as "the right end divided area 71D4." Further, each of four of the front divided areas 71D located in the middle of the front area 71 in the vehicle width direction Dy will be referred to as "the middle divided area 71D5."

As shown in FIG. 5, the predetermined area 72 is an area defined by a line L721, a line L722, a line L723, and a line L724. The line L721 extends parallel to the vehicle width direction Dy, passing through the rear camera 42. The line L722 extends parallel to the vehicle width direction Dy, passing through a point away rearward from the rear camera 42 by the predetermined distance Dset. The line L723 extends parallel to the vehicle longitudinal direction Dx, passing through a point away leftward from the rear camera 42 by the predetermined distance Dset. The line L724 extends parallel to the vehicle longitudinal direction Dx, passing through a point away rightward from the rear camera 42 by the predetermined distance Dset. Hereinafter, the predetermined area 72 will be referred to as "the rear area 72."

The rear area 72 is quadrisected in the vehicle width direction Dy and bisected in the vehicle longitudinal direction Dx. Therefore, the rear area 72 includes eight areas 72D. In other words, the rear area 72 is divided into the eight areas 72D having the same sizes. Hereinafter, each of the areas 72D will be referred to as "the rear divided area 72D." Further, each of two of the rear divided areas 72D located at the left end of the rear area 72 in the vehicle width direction Dy will be referred to as "the left end divided area 72D3." Further, each of two of the rear divided areas 72D located at the right end of the rear area 72 in the vehicle width direction Dy will be referred to as "the right end divided area 72D4." Further, each of four of the rear divided areas 72D located in the middle of the rear area 72 in the vehicle width direction Dy will be referred to as "the middle divided area 72D5."

Figure 6:
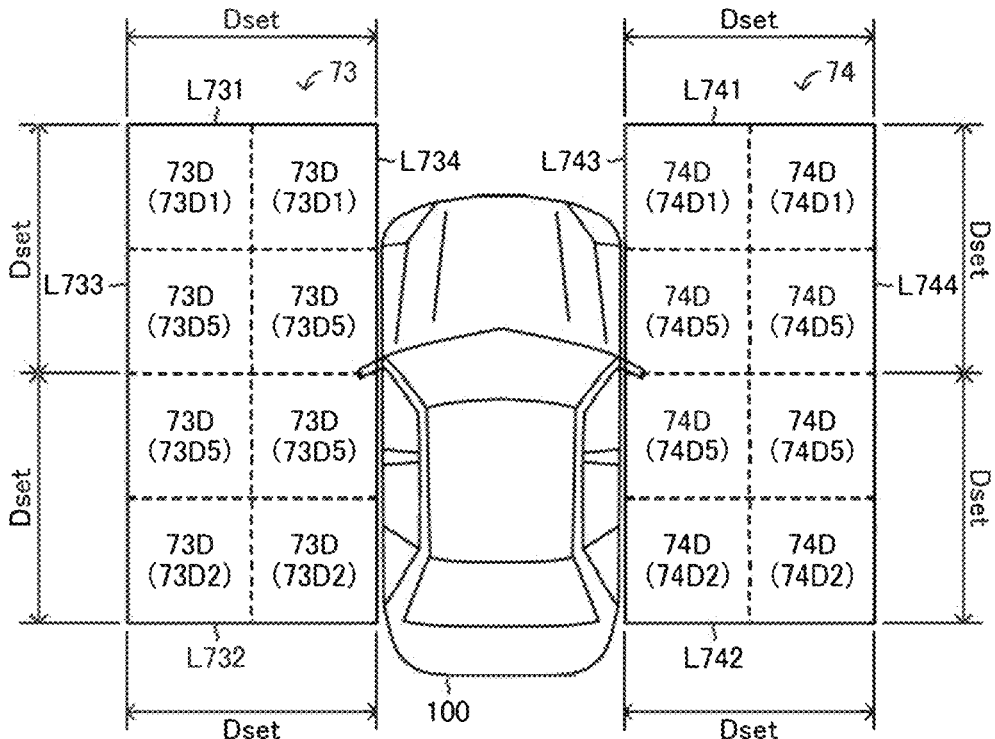
FIG. 6 is a view which shows a left area and a right area.

As shown in FIG. 6, the predetermined area 73 is an area defined by a line L731, a line L732, a line L733, and a line L734. The line L731 extends parallel to the vehicle width direction Dy, passing through a point away forward from the left camera 43 by the predetermined distance Dset. The line L732 extends parallel to the vehicle width direction Dy, passing through a point away rearward from the left camera 43 by the predetermined distance Dset. The line L733 extends parallel to the vehicle longitudinal direction Dx, passing through a point away leftward from the left camera 43 by the predetermined distance Dset. The line L734 extends parallel to the vehicle longitudinal direction Dx, passing through the left camera 43. Hereinafter, the predetermined area 73 will be referred to as "the left area 73."

The left area 73 is quadrisected in the vehicle longitudinal direction Dx and bisected in the vehicle width direction Dy. Therefore, the left area 73 includes eight areas 73D. In other words, the left area 73 is divided into the eight areas 73D having the same sizes. Hereinafter, each of the areas 73D will be referred to as "the left divided area 73D." Further, each of two of the left divided areas 73D located at the front end of the left area 73 in the vehicle longitudinal direction Dx will be referred to as "the front end divided area 73D1." Further, each of two of the left divided areas 73D located at the rear end of the left area 73 in the vehicle longitudinal direction Dx will be referred to as "the rear end divided area 73D2." Further, each of four of the left divided areas 73D located in the middle of the left area 73 in the vehicle longitudinal direction Dx will be referred to as "the middle divided area 73D5."

As shown in FIG. 6, the predetermined area 74 is an area defined by a line L741, a line L742, a line L743, and a line L744. The line L741 extends parallel to the vehicle width direction Dy, passing through a point away forward from the right camera 44 by the predetermined distance Dset. The line L742 extends parallel to the vehicle width direction Dy, passing through a point away rearward from the right camera 44 by the predetermined distance Dset. The line L743 extends parallel to the vehicle longitudinal direction Dx, passing through the right camera 44. The line L744 extends parallel to the vehicle longitudinal direction Dx, passing through a point away rightward from the right camera 44 by the predetermined distance Dset. Hereinafter, the predetermined area 74 will be referred to as "the right area 74."

The right area 74 is quadrisected in the vehicle longitudinal direction Dx and bisected in the vehicle width direction Dy. Therefore, the right area 74 includes eight areas 74D. In other words, the right area 74 is divided into the eight areas 74D having the same sizes. Hereinafter, each of the areas 74D will be referred to as "the right divided area 74D." Further, each of two of the right divided areas 74D located at the front end of the right area 74 in the vehicle longitudinal direction Dx will be referred to as "the front end divided area 74D1." Further, each of two of the right divided areas 74D located at the rear end of the right area 74 in the vehicle longitudinal direction Dx will be referred to as "the rear end divided area 74D2." Further, each of four of the right divided areas 74D located in the middle of the right area 74 in the vehicle longitudinal direction Dx will be referred to as "the middle divided area 74D5."

Figure 7:
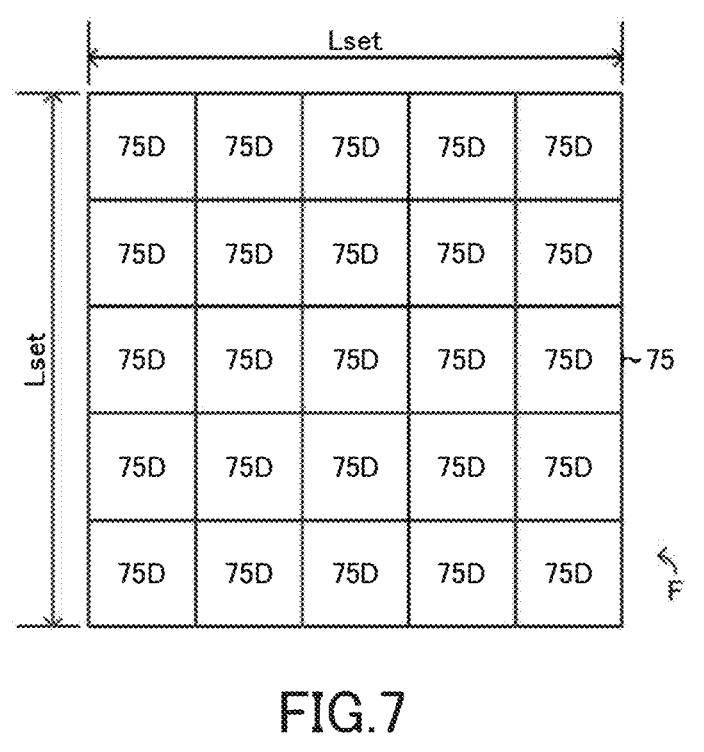

As shown in FIG. 7, when the image of each of the feature points F taken by the cameras 45 is converted into an image in a planar view, the converted image is a square area 75 defined by sides of predetermined lengths Lset. When a predetermined condition becomes satisfied, the vehicle parking assist apparatus 10 divides each of the feature points F into twenty five square areas 75D having the same sizes and acquires luminance values LUM of the areas 75D. Then, the vehicle parking assist apparatus 10 acquires values ΔLUM by subtracting an average value LUMave of the acquired luminance values LUM from each of the luminance values LUM (ΔLUM=LUM−LUMave). Then, the vehicle parking assist apparatus 10 acquires differences between the luminance values LUM of the feature point F, based on the values ΔLUM. Then, the vehicle parking assist apparatus 10 acquires a pattern of the acquired differences as luminance pattern information CT. Basically, when the predetermined condition becomes satisfied, the vehicle parking assist apparatus 10 acquires a luminance pattern of each of the images of the feature points F taken by the cameras 45 and acquires the acquired luminance patterns as the luminance pattern information CT.

The display 50 is provided at a portion of the vehicle 100 where the driver can see. In this embodiment, the display 50 is a display of a so-called navigation apparatus.

The display 50 is electrically connected to the ECU 90. The ECU 90 can cause the display 50 to display various images. In this embodiment, the ECU 90 can cause the display 50 to display a camera image 51C, a plane view image 51P, a parking assist switch image 51M, a registration main switch image 52M, a parking area selecting image 52S, a parking area line image 52, a setting button image 53, a registration start button image 54, a registering button image

55, a parking start button image 56, a displacing button image 57, and an angle adjusting button image 58.

The camera image 51C is an image taken by any one of the cameras 45.

The plane view image 51P is an image including a vehicle plane view image and a vehicle surrounding image. The vehicle plane view image is an image displaying the vehicle 100, viewed vertically from the above. The vehicle surrounding image is an image displaying surroundings of the vehicle 100, viewed vertically from the above. The vehicle surrounding image includes at least an image displaying the parking lot 62. The vehicle plane view image and the vehicle surrounding image are prepared by the ECU 90, based on the image information IMG.

The parking assist switch image 51M is an image displaying a parking assist switch to which the driver can apply a touch interaction to cause the vehicle parking assist apparatus 10 to start an execution of a parking assist control described later. In this embodiment, the parking assist switch is displayed on the display 50 as the parking assist switch image 51M. In this regard, the parking assist switch may be provided on the vehicle 100 as a switch which the driven can physically operates.

The registration main switch image 52M is an image displaying a registration main switch to which the driver can apply the touch interaction to register or memorize parking lot information Ipark in the vehicle parking assist apparatus 10 by the parking assist control.

Figures 9A, 9B, 9C, 9D:
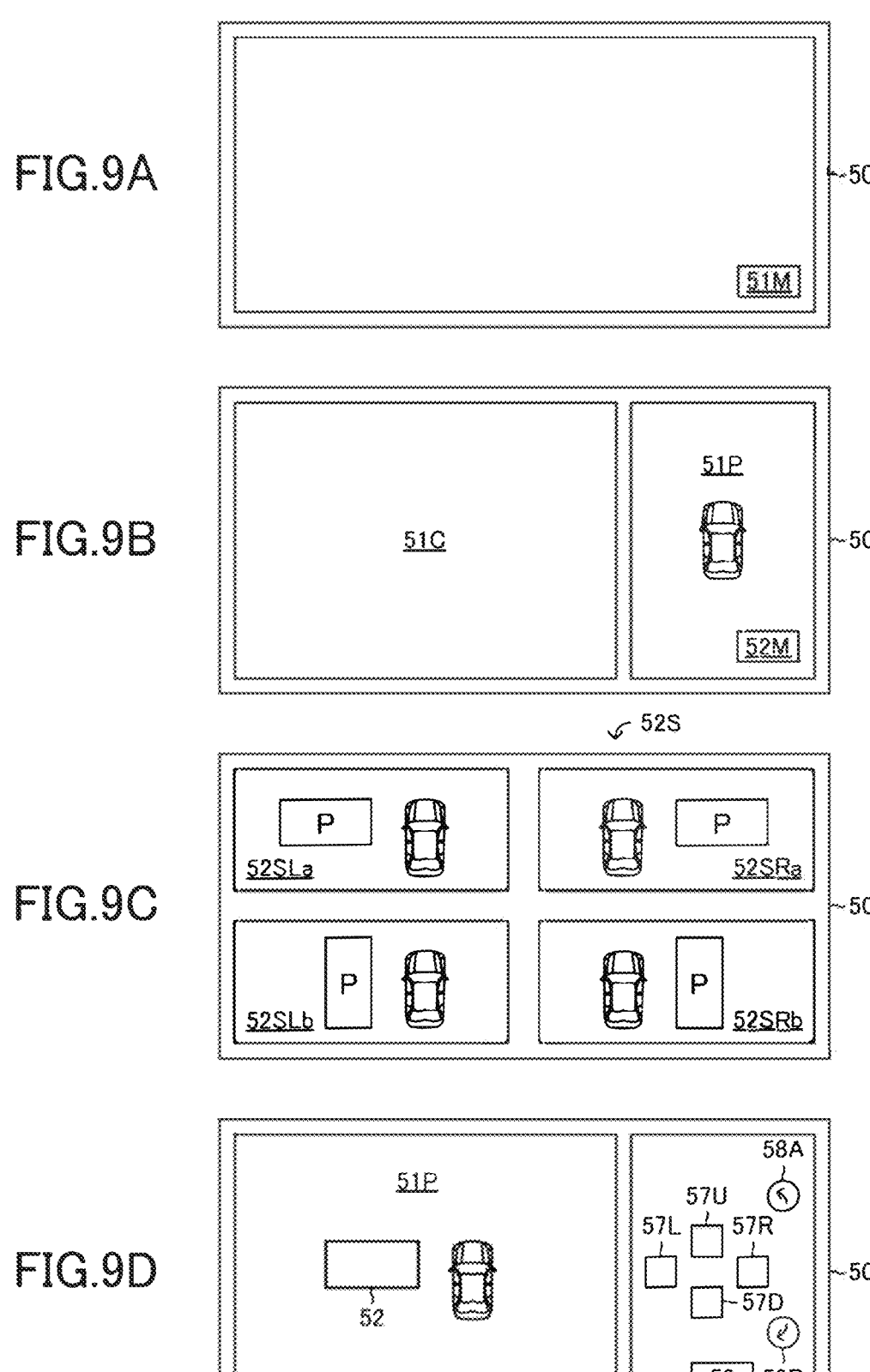
FIG. 9A to FIG. 9D are views which show displays.

As shown in FIG. 9C, the parking area selecting image 52S includes a left double parking area selecting image 52SLa, a left parallel parking area selecting image 52SLb, a right double parking area selecting image 52SRa, and a right parallel parking area selecting image 52SRb.

Figure 8:
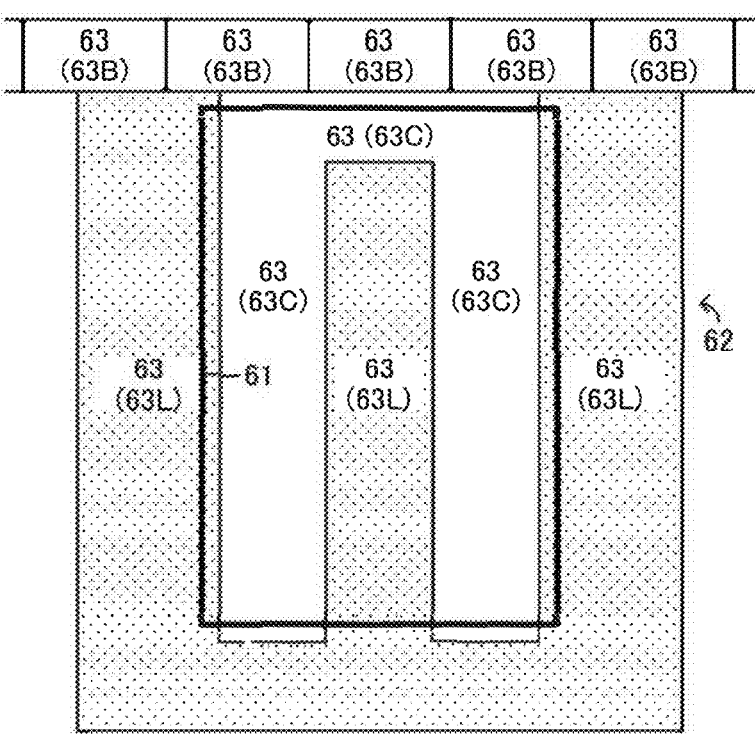
FIG. 8 is a view which shows a parking area.

The left double parking area selecting image 52SLa is an image to which the driver can apply the touch interaction to select the parking area 61 of the parking lot 62 located at the left side of the vehicle 100 where an orientation of the vehicle 100 parked in the parking area 61 has been changed by 90 degrees from the orientation of the vehicle 100 stopping by the parking lot 62. The parking area 61 is an area or a space or a region in which the vehicle 100 is parked by the parking assist control. As shown in FIG. 8, the parking area 61 is set in the parking lot 62. The left parallel parking area selecting image 52SLb is an image to which the driver can apply the touch interaction to select the parking area 61 of the parking lot 62 located at the left side of the vehicle 100 where the orientation of the vehicle 100 parked in the parking area 61 has not been changed from the orientation of the vehicle 100 stopping by the parking lot 62. The right double parking area selecting image 52SRa is an image to which the driver can apply the touch interaction to select the parking area 61 of the parking lot 62 located at the right side of the vehicle 100 where the orientation of the vehicle 100 parked in the parking area 61 has been changed by 90 degrees from the orientation of the vehicle 100 stopping by the parking lot 62. The right parallel parking area selecting image 52SRb is an image to which the driver can apply the touch interaction to select the parking area 61 of the parking lot 62 located at the right side of the vehicle 100 with the orientation of the vehicle 100 parked in the parking area 61 has not been changed from the orientation of the vehicle 100 stopping by the parking lot 62.

When there is not the parking area 61 of the parking lot 62 located at the left side of the vehicle 100 where the orientation of the vehicle 100 parked in the parking area 61 has been changed by 90 degrees from the orientation of the vehicle 100 stopping by the parking lot 62, the left double parking area selecting image 52SLa is not displayed on the display 50 or displayed on the display 50 with a low luminance level or a toned-down luminance level. Similarly, when there is not the parking area 61 of the parking lot 62 located at the left side of the vehicle 100 where the orientation of the vehicle 100 parked in the parking area 61 has not been changed from the orientation of the vehicle 100 stopping by the parking lot 62, the left parallel parking area selecting image 52SLb is not displayed on the display 50 or displayed on the display 50 with the low luminance level or the toned-down luminance level. Similarly, when there is not the parking area 61 of the parking lot 62 located at the right side of the vehicle 100 where the orientation of the vehicle 100 parked in the parking area 61 has been changed by 90 degrees from the orientation of the vehicle 100 stopping by the parking lot 62, the right double parking area selecting image 52SRa is not displayed on the display 50 or displayed on the display 50 with the low luminance level or the toned-down luminance level. Similarly, when there is not the parking area 61 of the parking lot 62 located at the right side of the vehicle 100 where the orientation of the vehicle 100 parked in the parking area 61 has not been changed from the orientation of the vehicle 100 stopping by the parking lot 62, the right parallel parking area selecting image 52SRb is not displayed on the display 50 or displayed on the display 50 with the low luminance level or the toned-down luminance level.

Even when the driver applies the touch interaction to the parking area selecting image 52S displayed with the toned-down luminance level, the ECU 90 does not determine that the parking area 61 corresponding to the parking area selecting image 52S subject to the touch interaction is selected.

The parking area line image 52 is an image displaying the parking area 61.

The setting button image 53 is an image displaying a setting button to which the driver can apply the touch interaction to set or fix or determine the parking area 61 in which the driver desires to park the vehicle 100 by the parking assist control.

The registration start button image 54 is an image displaying a registration start button to which the driver can apply the touch interaction to cause the vehicle parking assist apparatus 10 to start an execution of a first parking moving process described later of the parking assist control.

The registering button image 55 is an image displaying a registering button to which the driver can apply the touch interaction to cause the vehicle parking assist apparatus 10 to register therein (in particular, the RAM of the ECU 90) the parking lot information Ipark acquired by the parking assist control. The parking lot information Ipark is information on the parking lot 62 used by the vehicle parking assist apparatus 10 to autonomously park the vehicle 100 in the parking lot 62.

The parking start button image 56 is an image displaying a parking start button to which the driver can apply the touch interaction to cause the vehicle parking assist apparatus 10 to start the execution of the parking assist control to park the vehicle 100 in the parking area 61 registered in the vehicle parking assist apparatus 10.

The displacing button image 57 includes an upward displacing button image 57U, a downward displacing button image 57D, a leftward displacing button image 57L, and a rightward displacing button image 57R. The upward displacing button image 57U is an image to which the driver can apply the touch interaction to displace the parking area line image 52 upward on the display 50. The downward displacing button image 57D is an image to which the driver can apply the touch interaction to displace the parking area line image 52 downward on the display 50. The leftward displacing button image 57L is an image to which the driver can apply the touch interaction to displace the parking area line image 52 leftward on the display 50. The rightward displacing button image 57R is an image to which the driver can apply the touch interaction to displace the parking area line image 52 rightward on the display 50.

The angle adjusting button image 58 includes a counterclockwise angle adjusting button image 58A and a clockwise angle adjusting button image 58B. The counterclockwise angle adjusting button image 58A is an image to which the driver can apply the touch interaction to turn the parking area line image 52 counterclockwise on the display 50. The clockwise angle adjusting button image 58B is an image to which the driver can apply the touch interaction to turn the parking area line image 52 clockwise on the display 50.

<Summary of Operations of Vehicle Parking Assist Apparatus>

Next, a summary of operations of the vehicle parking assist apparatus 10 will be described. The vehicle parking assist apparatus 10 can execute the parking assist control. The parking assist control is a control to autonomously park the vehicle 100 in the parking area 61 without any operations applied to the acceleration pedal 14, the brake pedal 15, and the steering wheel 16 by the driver.

There are parking lots in which the parking areas are partitioned by lines such as white lines. Hereinafter, each of the lines partitioning the parking areas will be referred to as "the parking area line." In the parking lot in which the parking areas are partitioned by the parking area lines, the vehicle parking assist apparatus can use the parking area lines taken by the camera to autonomously park the vehicle in the parking area.

On the other hand, there are the parking lots such as the parking lot of the private house in which the parking areas are not partitioned by the parking area lines. In the parking lot in which the parking areas are not partitioned by the parking area lines, there are not the parking area lines which the vehicle parking assist apparatus uses to autonomously park the vehicle 100 in the parking area. The parking assist control which the vehicle parking assist apparatus 10 executes, includes (i) a control to autonomously park the vehicle in the parking lot and register the parking lot information on the parking lot in which the vehicle has been parked and (ii) a control to autonomously park the vehicle in the parking lot registered by the parking lot information.

When the vehicle moving speed SPD becomes equal to or smaller than a predetermined vehicle moving speed SPDth, the vehicle parking assist apparatus 10 starts to execute a searching process to search the camera image CMR to find image parts having the same luminance patterns as the luminance patterns of registration entrance feature points Fent_reg. The vehicle parking assist apparatus 10 executes the searching process, using the left image information IMG3 and the right image information IMG4. As described later in detail, the registration entrance feature points Fent_reg are entrance feature points Fent having the luminance patterns registered or memorized in the vehicle parking assist apparatus 10 by registration entrance luminance pattern information CTent_reg registered by the parking assist control. The entrance feature points Fent are the feature points F in the camera image CMR of the entrance 62ent of the parking lot 62 acquired by the parking assist control. The registration entrance luminance pattern information CTent_reg is the luminance pattern information CT on the registration entrance feature points Fent_reg. The camera image CMR is the image taken and acquired by the cameras 45.

When the vehicle parking assist apparatus 10 finds the image parts in the camera image CMR, the vehicle parking assist apparatus 10 compares or matches a relationship in position between the found image parts with a relationship in position between the registration entrance feature points Fent_reg having the luminance patterns corresponding to the luminance patterns of the found image parts.

When the relationship in position between the found image parts matches the relationship in position between the registration entrance feature points Fent_reg having the luminance patterns corresponding to the luminance patterns of the found image parts, the vehicle parking assist apparatus 10 determines that the registered parking lot 62 exists by the vehicle 100. The registered parking lot 62 is the parking lot registered or memorized in the vehicle parking assist apparatus 10 by the parking lot information Ipark registered by the parking assist control.

In particular, when the relationship in position between the image parts found, based on the left image information IMG3 matches the relationship in position between the registration entrance feature points Fent_reg having the luminance patterns corresponding to the luminance patterns of the found image parts, the vehicle parking assist apparatus 10 determines that the registered parking lot 62 exists at the left side of the vehicle 100.

On the other hand, when the relationship in position between the image parts found, based on the right image information IMG4 matches the relationship in position between the registration entrance feature points Fent_reg having the luminance patterns corresponding to the luminance patterns of the found image parts, the vehicle parking assist apparatus 10 determines that the registered parking lot 62 exists at the right side of the vehicle 100.

When the vehicle parking assist apparatus 10 does not find the image parts in the camera image CMR, the vehicle parking assist apparatus 10 determines that the registered parking lot 62 does not exist by the vehicle 100. Also, when the relationship in position between the found image parts does not match the relationship in position between the registration entrance feature points Fent_reg having the luminance patterns corresponding to the luminance patterns of the found image parts, the vehicle parking assist apparatus 10 determines that the registered parking lot 62 does not exist by the vehicle 100.

<Registration of Parking Lot>

When (i) the vehicle parking assist apparatus 10 determines that the vehicle 100 stops by the entrance 62ent of the parking lot 62, (ii) the touch interaction is applied to the parking assist switch image 51M, and then (iii) the touch interaction is applied to the registration start button image 54, the vehicle parking assist apparatus 10 starts to execute a process of registering the parking lot information Ipark to acquire preliminary entrance information Ient_pre and preliminary midway information Imid_pre as described below. In addition, the vehicle parking assist apparatus 10 registers or memorizes (i) registration entrance information Ient_reg, (ii) registration inside information Iin_reg, and (iii) registration area information Iarea_reg as the parking lot information Ipark as described below.

In particular, when (i) the vehicle parking assist apparatus 10 determines that the vehicle 100 stops by the entrance 62ent of the parking lot 62, (ii) the vehicle parking assist apparatus 10 determines that the parking lot 62 existing by the vehicle 100 is not the registered parking lot, and (iii) the driver applies the touch interaction to the parking assist switch image 51M displayed on the display 50 as shown in FIG. 9A, the vehicle parking assist apparatus 10 terminates displaying the parking assist switch image 51M on the display 50 and displays the camera image 51C, the plane view image 51P, and the registration main switch image 52M on the display 50 as shown in FIG. 9B.

When the driver applies the touch interaction to the registration main switch image 52M, the vehicle parking assist apparatus 10 terminates displaying the camera image 51C, the plane view image 51P, and the registration main switch image 52M on the display 50 and displays the parking area selecting image 52S on the display 50 as shown in FIG. 9C.

When the driver applies the touch interaction to the parking area selecting image 52S displayed on the display 50 with the non-toned-down luminance level, the vehicle parking assist apparatus 10 terminates displaying the parking area selecting image 52S on the display 50 and displays the plane view image 51P, the parking area line image 52, the setting button image 53, the displacing button image 57, and the angle adjusting button image 58 on the display 50 as shown in FIG. 9D. In addition, when the non-registered parking lot 62 exists at the left side of the vehicle 100, the vehicle parking assist apparatus 10 displays the plane view image 51P on the display 50 such that a parking lot image is displayed at the left side of a vehicle image. On the other hand, when the non-registered parking lot 62 exists at the right side of the vehicle 100, the vehicle parking assist apparatus 10 displays the plane view image 51P on the display 50 such that the parking lot image is displayed at the right side of the vehicle image.

In addition, the vehicle parking assist apparatus 10 sets the parking area 61 to an area in which the vehicle 100 can be parked, based on the image information IMG and the sonar information SON. Then, the vehicle parking assist apparatus 10 displays the set parking area 61 on the display 50 by the parking area line image 52. The vehicle parking assist apparatus 10 uses, for example, the sonar information SON to acquire a size of the entrance 62ent of the parking lot 62.

The driver can displace the parking area line image 52 on the display 50 by applying the touch interaction to the displacing button image 57 before the driver applies the touch interaction to the setting button image 53. The driver can change a position of the parking area 61 to a position in which the driver desires to park the vehicle 100 by displacing the parking area line image 52 on the display 50. In addition, the driver can turn the parking area line image 52 on the display 50 by applying the touch interaction to the angle adjusting button image 58 before the driver applies the touch interaction to the setting button image 53. The driver can change the position of the parking area 61 to the position in which the driver desires to park the vehicle 100 by turning the parking area line image 52 on the display 50.

Figures 10A, 10B, 10C:
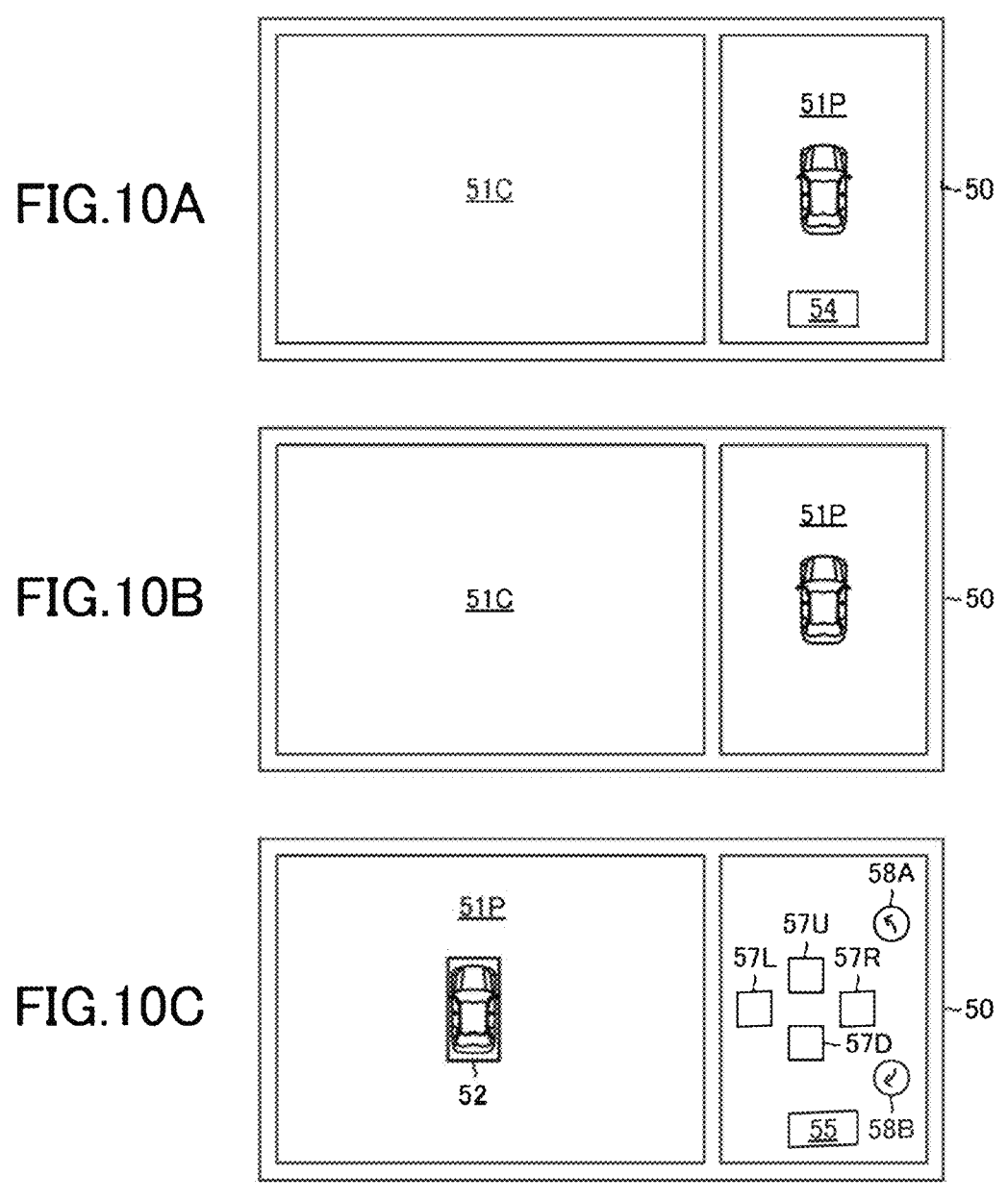

When the driver applies the touch interaction to the setting button image 53, the vehicle parking assist apparatus 10 terminates displaying the setting button image 53, the displacing button image 57, and the angle adjusting button image 58 on the display 50 and displays the camera image 51C, the plane view image 51P, and the registration start button image 54 on the display 50 as shown in FIG. 10A.

In addition, when the driver applies the touch interaction to the setting button image 53, the vehicle parking assist apparatus 10 acquires the position of the parking area 61 corresponding to the position of the parking area line image 52 displayed on the display 50. Then, the vehicle parking assist apparatus 10 sets the parking area 61 of the acquired position as a registration target parking area 61 set.

Figure 11:
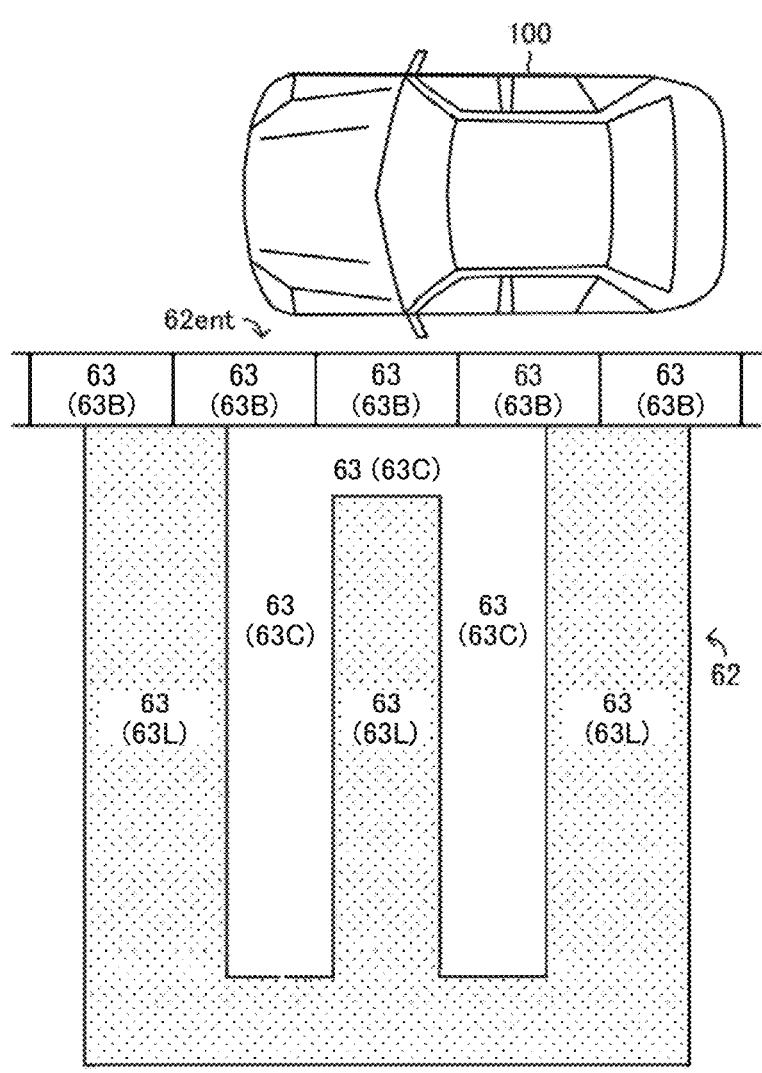
FIG. 11 is a view used for describing operations of the vehicle parking assist apparatus according to the embodiment of the invention.
Figure 12:
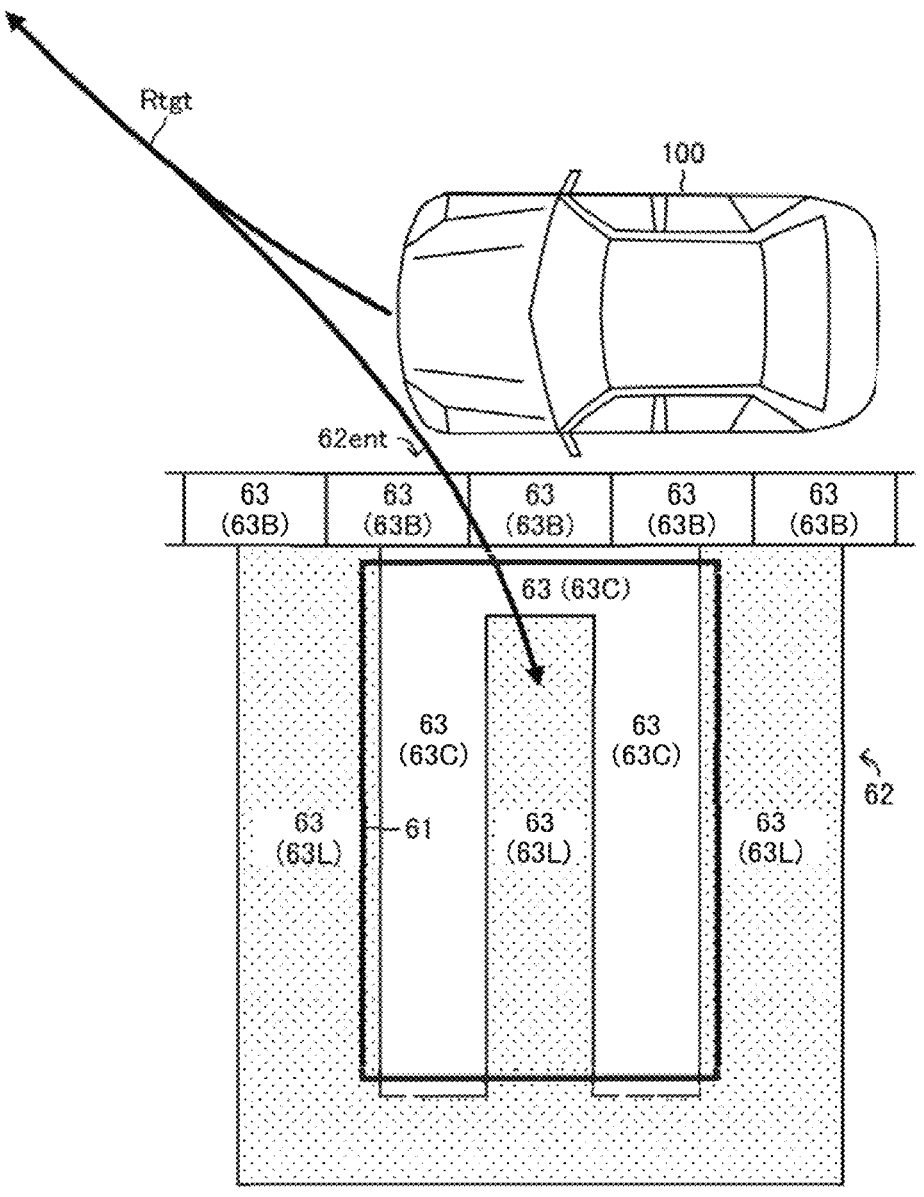
FIG. 12 is a view used for describing the operations of the vehicle parking assist apparatus according to the embodiment of the invention.

In addition, when the driver applies the touch interaction to the setting button image 53, the vehicle parking assist apparatus 10 sets a target moving route Rtgt to move the vehicle 100 to park the vehicle 100 in the registration target parking area 61set. For example, when the vehicle 100 stops at the right side of the non-registered parking lot 62 as shown in FIG. 11, the vehicle parking assist apparatus 10 sets the target moving route Rtgt as shown in FIG. 12.

In addition, when (i) the vehicle 100 stops at the right side of the parking lot 62, and (ii) the driver applies the touch interaction to the setting button image 53, the vehicle parking assist apparatus 10 acquires a predetermined one or more number of the new left feature point(s) F3new in each of the four middle divided areas 73D5, the two front end divided areas 73D1, and the two rear end divided areas 73D2 of the left area 73. At this time, the vehicle parking assist apparatus 10 acquires the new left feature points F3new as the entrance feature points Fent. On the other hand, when (i) the vehicle 100 stops at the left side of the parking lot 62, and (ii) the driver applies the touch interaction to the setting button image 53, the vehicle parking assist apparatus 10 acquires the predetermined one or more number of the new right feature point(s) F4new in each of the four middle divided areas 74D5, the two front end divided areas 74D1, and the two rear end divided areas 74D2 of the right area 74. At this time, the vehicle parking assist apparatus 10 acquires the new right feature points F4new as the entrance feature points Fent.

In this embodiment, when (i) the vehicle 100 stops at the right side of the parking lot 62, and (ii) the driver applies the touch interaction to the setting button image 53, the vehicle parking assist apparatus 10 acquires the entrance feature points Fent such that the number of the entrance feature points Fent acquired at each of the middle divided areas 73D5 is larger than the number of the entrance feature points Fent acquired at each of the front end divided areas 73D1 and the rear end divided areas 73D2. Basically, the vehicle parking assist apparatus 10 acquires the entrance feature points Fent such that the number of the entrance feature points Fent acquired at each of the areas 73D5 near a center of the entrance 62ent of the parking lot 62 is larger than the number of the entrance feature points Fent acquired at each of the areas 73D1 and 73D2 away from the center of the entrance 62ent of the parking lot 62.

On the other hand, when (i) the vehicle 100 stops at the left side of the parking lot 62, and (ii) the driver applies the touch interaction to the setting button image 53, the vehicle parking assist apparatus 10 acquires the entrance feature points Fent such that the number of the entrance feature points Fent acquired at each of the middle divided areas 74D5 is larger than the number of the entrance feature points Fent acquired at each of the front end divided areas 74D1 and the rear end divided areas 74D2. Basically, the vehicle parking assist apparatus 10 acquires the entrance feature points Fent such that the number of the entrance feature points Fent acquired at each of the areas 74D5 near the center of the entrance 62ent of the parking lot 62 is larger than the number of the entrance feature points Fent acquired at each of the areas 74D1 and 74D2 away from the center of the entrance 62ent of the parking lot 62.

Figure 13:
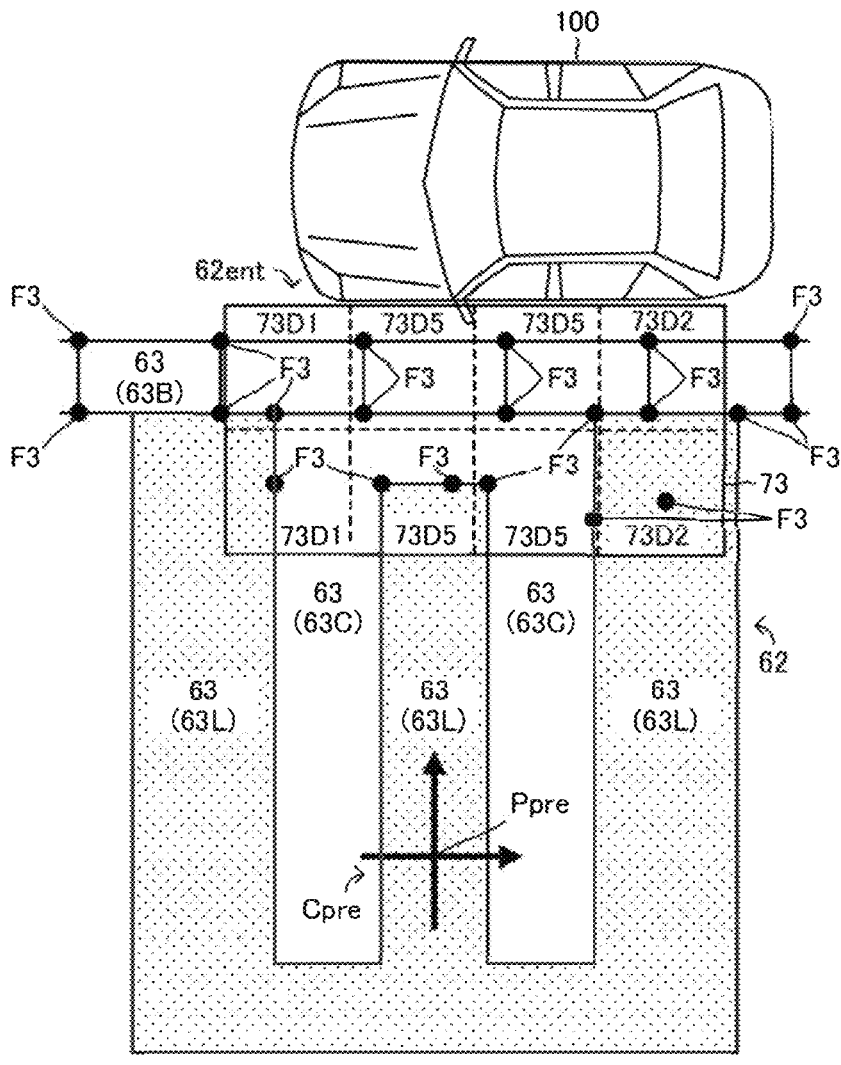
FIG. 13 is a view used for describing the operations of the vehicle parking assist apparatus according to the embodiment of the invention.
Figure 14:
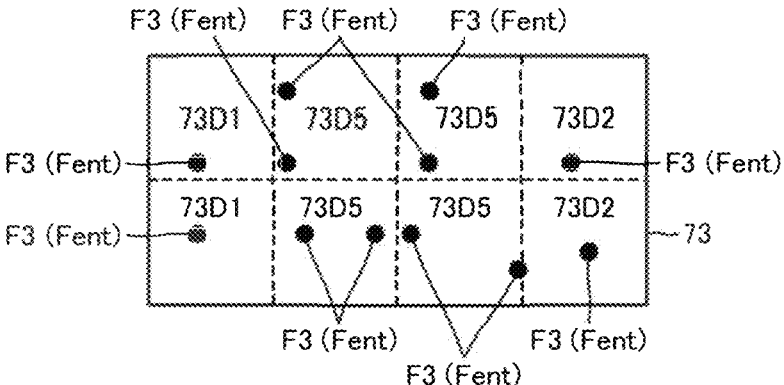
FIG. 14 is a view which shows entrance feature points.

For example, when the vehicle 100 stops at the right side of the parking lot 62 as shown in FIG. 11, the vehicle parking assist apparatus 10 acquires (i) the two new left feature points F3new as the entrance feature points Fent from each of the four middle divided areas 73D5 of the left area 73, (ii)

the one new left feature point F3new as the entrance feature point Fent from each of the two front end divided areas 73D1 of the left area 73, and (iii) the one new left feature point F3new as the entrance feature point Fent from each of the two rear end divided areas 73D2 of the left area 73 (see FIG. 13 and FIG. 14). On the other hand, when the vehicle 100 stops at the left side of the parking lot 62, the vehicle parking assist apparatus 10 acquires (i) the two new right feature points F4new as the entrance feature points Fent from each of the four middle divided areas 74D5 of the right area 74, (ii) the one new left feature point F4new as the entrance feature point Fent from each of the two front end divided areas 74D1 of the right area 74, and (iii) the one new left feature point F4new as the entrance feature point Fent from each of the two rear end divided areas 74D2 of the right area 74.

It should be noted that the vehicle parking assist apparatus 10 may be configured to acquire the entrance feature points Fent such that the number of the entrance feature points Fent acquired from each of the two front end divided areas 73D1 and the two middle divided areas 73D5 adjacent to the front end divided areas 73D1 is larger than the number of the entrance feature points Fent acquired from each of the two rear end divided areas 73D2 and the two middle divided areas 73D5 adjacent to the rear end divided areas 73D2 when the driver tends to stop the vehicle 100 at the right side of the entrance 62ent of the parking lot 62 and slightly before a position immediately lateral to the entrance 62ent of the parking lot 62. Similarly, the vehicle parking assist apparatus 10 may be configured to acquire the entrance feature points Fent such that the number of the entrance feature points Fent acquired from each of the two front end divided areas 74D1 and the two middle divided areas 74D5 adjacent to the front end divided areas 74D1 is larger than the number of the entrance feature points Fent acquired from each of the two rear end divided areas 74D2 and the two middle divided areas 74D5 adjacent to the rear end divided areas 74D2 when the driver tends to stop the vehicle 100 at the left side of the entrance 62ent of the parking lot 62 and slightly before the position immediately lateral to the entrance 62ent of the parking lot 62.

When the vehicle parking assist apparatus 10 cannot acquire the predetermined number of the new left feature points F3new from at least one of the middle divided areas 73D5, the front end divided areas 73D1, and the rear end divided areas 73D2 of the left area 73, the vehicle parking assist apparatus 10 acquires the entrance feature points Fent from the remaining of the middle divided areas 73D5, the front end divided areas 73D1, and the rear end divided areas 73D2 to compensate a shortfall of the number of the acquired entrance feature points Fent. Similarly, when the vehicle parking assist apparatus 10 cannot acquire the predetermined number of the new right feature points F4new from at least one of the middle divided areas 74D5, the front end divided areas 74D1, and the rear end divided areas 74D2 of the right area 74, the vehicle parking assist apparatus 10 acquires the entrance feature points Fent from the remaining of the middle divided areas 74D5, the front end divided areas 74D1, and the rear end divided areas 74D2 to compensate the shortfall of the number of the acquired entrance feature points Fent.

After the vehicle parking assist apparatus 10 acquires the entrance feature points Fent, the vehicle parking assist apparatus 10 acquires coordinates XY of each of the acquired entrance feature points Fent in a preliminary coordinate system Cpre and memorizes the acquired coordinates XY as preliminary entrance coordinates XYent_pre. In addition, the vehicle parking assist apparatus 10 acquires the luminance pattern information CT on each of the acquired entrance feature points Fent and memorizes the acquired luminance pattern information CT as preliminary entrance luminance pattern information CTent_pre. The preliminary coordinate system Cpre is a coordinate system in which a predetermined point Ppre in the registration target parking area 61 set is the origin. Therefore, the preliminary entrance coordinates XYent_pre indicates a position of the entrance feature point Fent relative to the predetermined position Ppre. The preliminary entrance information Ient_pre includes the preliminary entrance coordinates XYent_pre and the preliminary entrance luminance pattern information CTent_pre.

When the driver applies the touch interaction to the registration start button image 54, the vehicle parking assist apparatus 10 terminates displaying the registration start button image 54 on the display 50 and continues displaying the camera image 51C and the plane view image 51P on the display 50 as shown in FIG. 10B. In this case, when the non-registered parking lot 62 exists at the left side of the vehicle 100, the vehicle parking assist apparatus 10 acquires the image displaying the non-registered parking lot 62 from the left camera 43 and displays the acquired image on the display 50 as the camera image 51C. In addition, the vehicle parking assist apparatus 10 displays the plane view image 51P on the display 50 such that the parking lot image is displayed at the left side of the vehicle image. On the other hand, when the non-registered parking lot 62 exists at the right side of the vehicle 100, the vehicle parking assist apparatus 10 acquires the image displaying the non-registered parking lot 62 from the right camera 44 and displays the acquired image on the display 50 as the camera image 51C. In addition, the vehicle parking assist apparatus 10 displays the plane view image 51P on the display 50 such that the parking lot image is displayed at the right side of the vehicle image.

In addition, when the driver applies the touch interaction to the registration start button image 54, the vehicle parking assist apparatus 10 starts to execute the first parking moving process to move the vehicle 100 to the registration target parking area 61 set along the target moving route Rtgt. The first parking moving process is a process to control the operations of the vehicle driving force generation apparatus 11, the brake apparatus 12, and the steering apparatus 13 to move the vehicle 100 along the target moving route Rtgt, based on (i) the image information IMG, (ii) the object information OBJ, (iii) the steering angle θst, (iv) the steering torque TQst, (v) the vehicle moving speed SPD, (vi) the vehicle yaw rate YR, (vii) the vehicle longitudinal acceleration Gx, and (viii) the vehicle lateral acceleration Gy.

Figure 15:
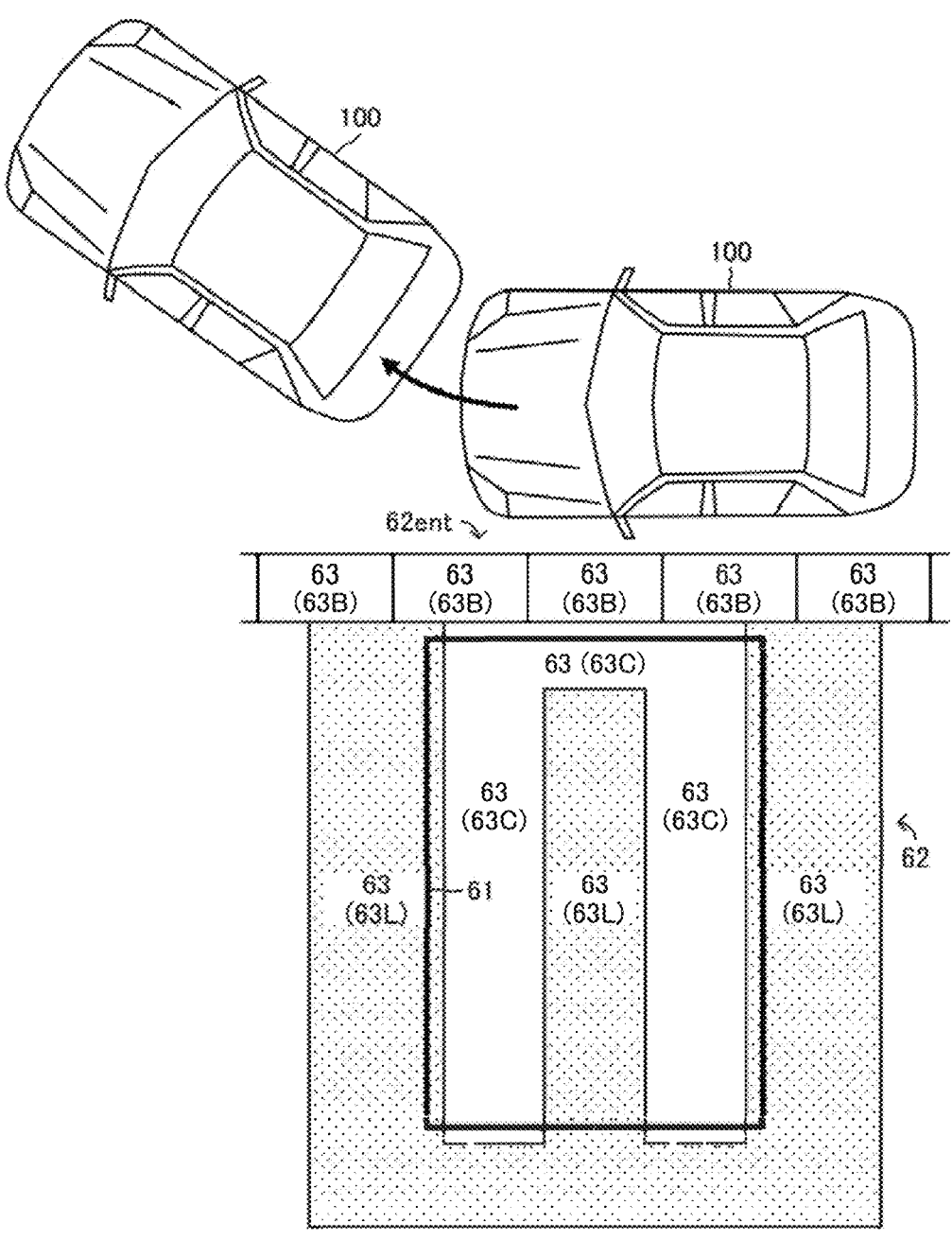
FIG. 15 is a view used for describing the operations of the vehicle parking assist apparatus according to the embodiment of the invention.
Figure 16:
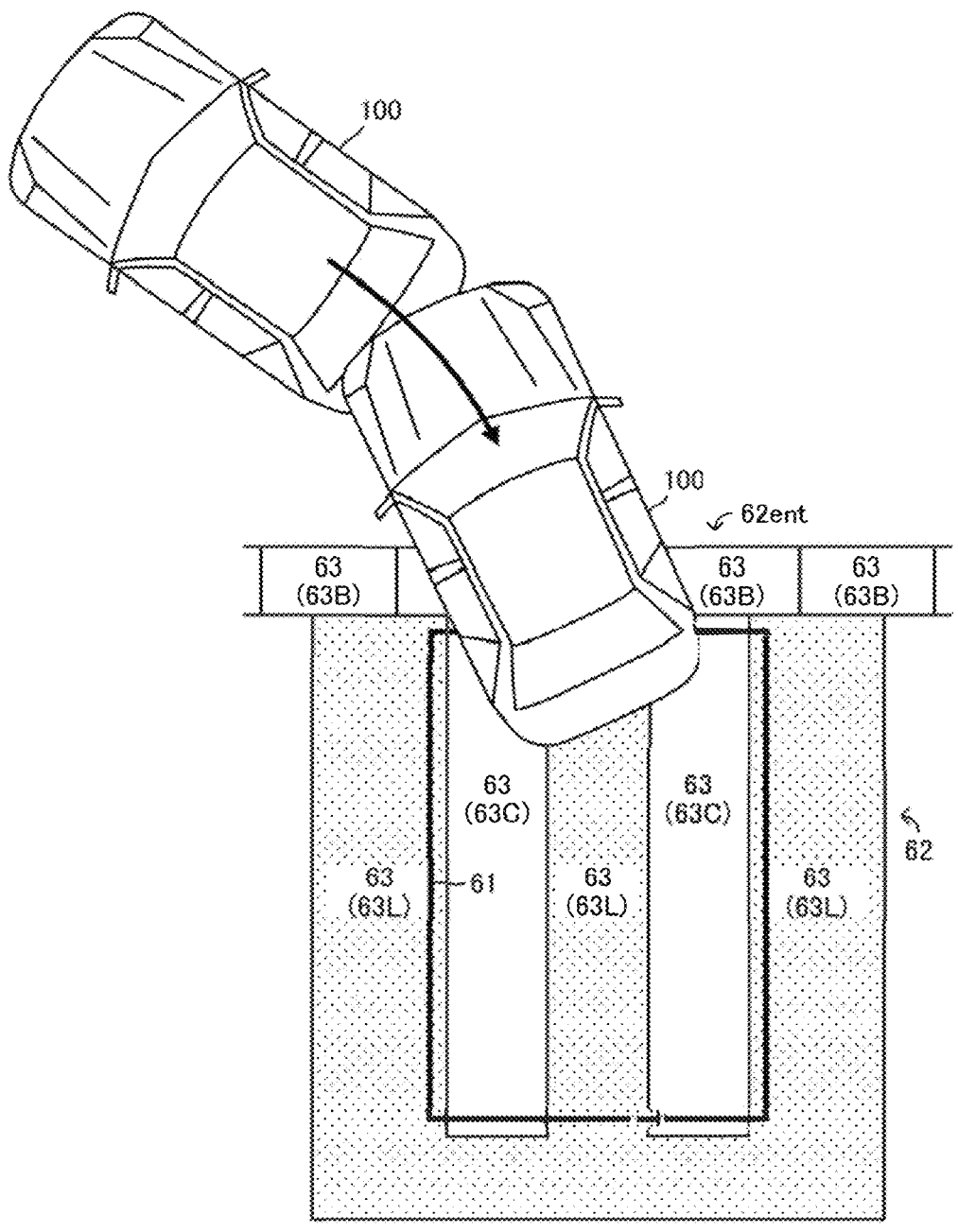
FIG. 16 is a view used for describing the operations of the vehicle parking assist apparatus according to the embodiment of the invention.

For example, when the vehicle 100 stops at the right side of the non-registered parking lot 62 as shown in FIG. 11, the vehicle parking assist apparatus 10 starts to execute the first parking moving process to move the vehicle 100 forward right and stops the vehicle 100 as shown in FIG. 15. Then, the vehicle parking assist apparatus 10 moves the vehicle 100 rearward left as shown in FIG. 16.

The vehicle parking assist apparatus 10 acquires the feature points F at least once before or when the vehicle parking assist apparatus 10 completes parking the vehicle 100 in the parking lot 62 by the parking assist control. Then, the vehicle parking assist apparatus 10 acquires the coordinates XY of the acquired feature points F in the preliminary coordinate system Cpre and the luminance pattern information CT on the acquired feature points F. In particular, after the vehicle parking assist apparatus 10 starts to move the vehicle 100 in order to park the vehicle 100 in the parking lot 62, the vehicle parking assist apparatus 10 acquires the feature points F at least once when the vehicle parking assist apparatus 10 predicts that the vehicle 100 continues moving straight without turning until the vehicle parking assist apparatus 10 completes parking the vehicle 100 in the parking lot 62 by the parking assist control. Then, the vehicle parking assist apparatus 10 acquires the coordinates XY of the acquired feature points F in the preliminary coordinate system Cpre and the luminance pattern information CT on the acquired feature points F.

Figure 17:
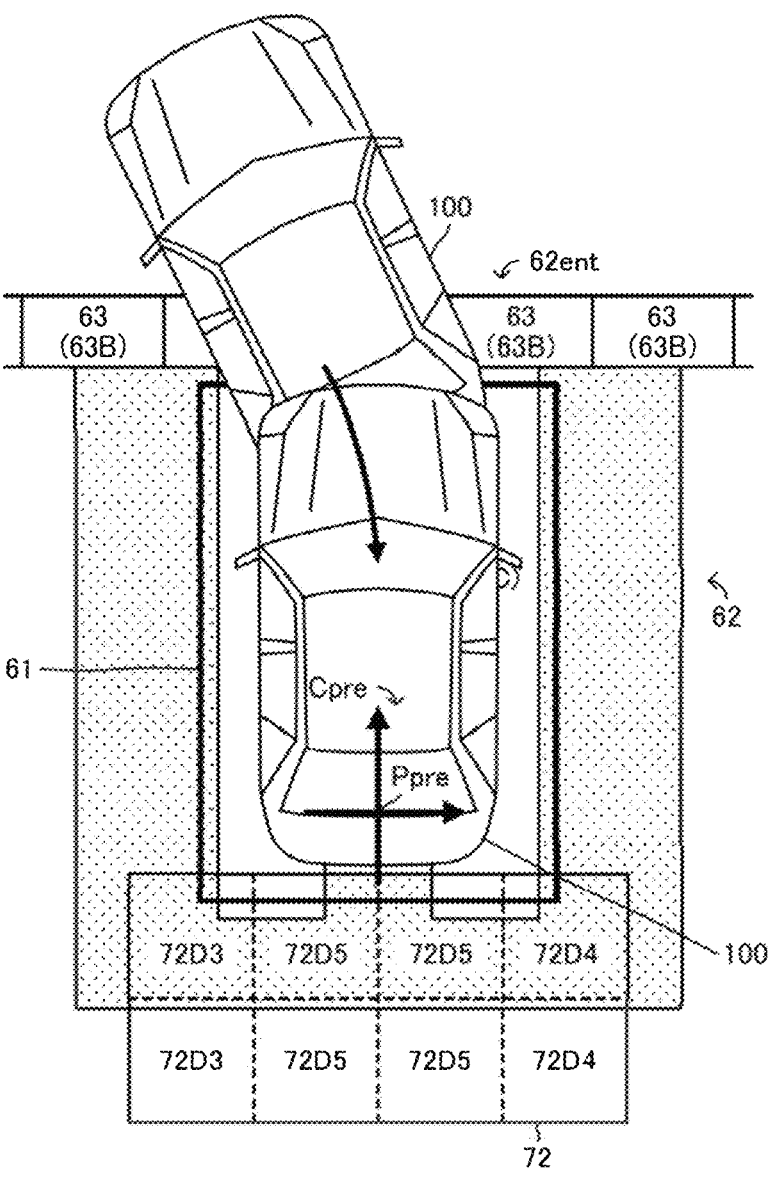
FIG. 17 is a view used for describing the operations of the vehicle parking assist apparatus according to the embodiment of the invention.

In this embodiment, the vehicle parking assist apparatus 10 acquires the rear feature points F2 as new rear feature points F2new when the vehicle parking assist apparatus 10 predicts that the vehicle 100 continues moving rearward straight without turning until the vehicle parking assist apparatus 10 completes parking the vehicle 100 in the parking lot 62 by the parking assist control (see FIG. 17). It should be noted that the vehicle parking assist apparatus 10 may acquire the rear feature points F2 when the vehicle 100 moves a predetermined distance Dtravel_th after the vehicle parking assist apparatus 10 predicts that the vehicle 100 continues moving rearward straight without turning until the vehicle parking assist apparatus 10 completes parking the vehicle 100 in the parking lot 62 by the parking assist control. Alternatively, the vehicle parking assist apparatus 10 may acquire (i) the rear feature points F2 when the vehicle parking assist apparatus 10 predicts that the vehicle 100 continues moving rearward straight without turning until the vehicle parking assist apparatus 10 completes parking the vehicle 100 in the parking lot 62 by the parking assist control and (ii) the rear feature points F2 when the vehicle 100 moves the predetermined distance Dtravel_th after the vehicle parking assist apparatus 10 predicts that the vehicle 100 continues moving rearward straight without turning until the vehicle parking assist apparatus 10 completes parking the vehicle 100 in the parking lot 62 by the parking assist control. Alternatively, the vehicle parking assist apparatus 10 may acquire (i) the rear feature points F2 when the vehicle parking assist apparatus 10 predicts that the vehicle 100 continues moving rearward straight without turning until the vehicle parking assist apparatus 10 completes parking the vehicle 100 in the parking lot 62 by the parking assist control and (ii) the rear feature points F2 each time the vehicle 100 moves the predetermined distance Dtravel_th after the vehicle parking assist apparatus 10 predicts that the vehicle 100 continues moving rearward straight without turning until the vehicle parking assist apparatus 10 completes parking the vehicle 100 in the parking lot 62 by the parking assist control. Alternatively, the vehicle parking assist apparatus 10 may acquire the rear feature points F2 each time the vehicle 100 moves the predetermined distance Dtravel_th after the vehicle parking assist apparatus 10 predicts that the vehicle 100 continues moving rearward straight without turning until the vehicle parking assist apparatus 10 completes parking the vehicle 100 in the parking lot 62 by the parking assist control. Further, the vehicle parking assist apparatus 10 may acquire the front feature points F1, the left feature points F3 and/or the right feature points F4 in addition to the rear feature points F2.

In this embodiment, the predetermined distance Dtravel_th is set to a distance which can prevent an area of the parking lot 62 corresponding to the rear area 72 at the time of the rear feature points F2 being acquired this time from overlapping the area of the parking lot 62 corresponding to the rear area 72 at the time of the rear feature points F2 being acquired last time.

Then, the vehicle parking assist apparatus 10 acquires one or more of the new rear feature points F2new from each of the rear divided areas 72D and sets the acquired new rear feature points F2new as midway feature points Fmid. Then, the vehicle parking assist apparatus 10 acquires the coordinates XY of the acquired midway feature points Fmid in the preliminary coordinate system Cpre and memorizes the acquired coordinates XY as preliminary midway coordinates XYmid_pre. In addition, the vehicle parking assist apparatus 10 acquires the luminance pattern information CT on the acquired midway feature points Fmid and memorizes the acquired luminance pattern information CT as preliminary midway luminance pattern information CTmid_pre. The preliminary midway coordinates XYmid_pre indicate positions of the midway feature points Fmid relative to the predetermined position Ppre. The preliminary midway information Imid_pre includes the preliminary midway coordinates XYmid_pre and the preliminary midway luminance pattern information CTmid_pre.

Further, while the vehicle parking assist apparatus 10 executes the first parking moving process to move the vehicle 100 along the target moving route Rtgt, the vehicle parking assist apparatus 10 executes a safety determination process to determine whether the vehicle parking assist apparatus 10 can move the vehicle 100 safely to the registration target parking area 61set, preventing the vehicle 100 from contacting to the standing object in the parking lot 62. When the vehicle parking assist apparatus 10 determines that the vehicle parking assist apparatus 10 cannot move the vehicle 100 safely to the registration target parking area 61set, the vehicle parking assist apparatus 10 corrects the target moving route Rtgt such that the vehicle parking assist apparatus 10 can move the vehicle 100 safely to the registration target parking area 61set, preventing the vehicle 100 from contacting to the standing object in the parking lot 62. The vehicle parking assist apparatus 10 executes the safety determination process, based on the image information IMG and the object information OBJ which the vehicle parking assist apparatus 10 acquires during the execution of the first parking moving process.

In addition, while the vehicle parking assist apparatus 10 executes the first parking moving process to move the vehicle 100 along the target moving route Rtgt, the vehicle parking assist apparatus 10 executes a route determination process to determine whether the vehicle parking assist apparatus 10 can park the vehicle 100 in the registration target parking area 61 set. When the vehicle parking assist apparatus 10 determines that the vehicle parking assist apparatus 10 cannot park the vehicle 100 in the registration target parking area 61set, the vehicle parking assist apparatus 10 corrects the target moving route Rtgt such that the vehicle parking assist apparatus 10 can park the vehicle 100 in the registration target parking area 61set. The vehicle parking assist apparatus 10 executes the route determination process, based on the image information IMG (in particular, the feature points F) which the vehicle parking assist apparatus 10 acquires during the execution of the first parking moving process.

Figure 18:
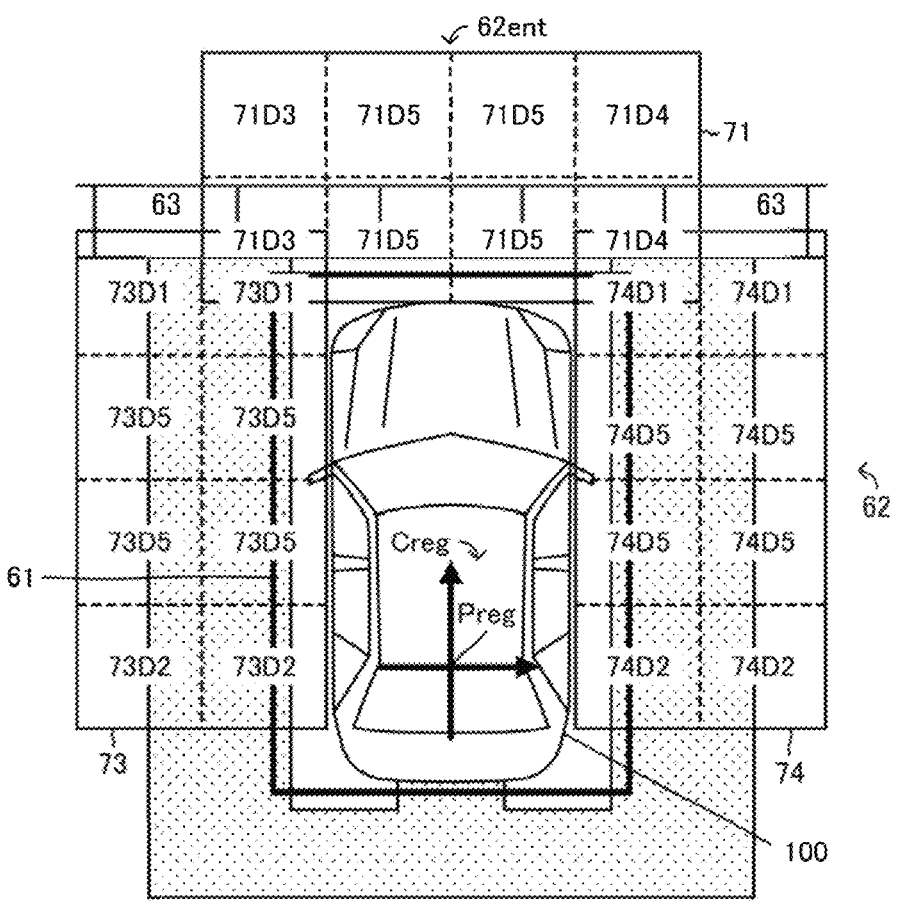
FIG. 18 is a view used for describing the operations of the vehicle parking assist apparatus according to the embodiment of the invention.

When the entire vehicle 100 has moved in the registration target parking area 61 set (see FIG. 18), the vehicle parking assist apparatus 10 stops the vehicle 100 and terminates executing the first parking moving process. Thereby, parking the vehicle 100 in the parking lot 62 by the parking assist control is completed. At this time, the vehicle parking assist apparatus 10 acquires the front feature points F1, the left feature points F3, and the right feature points F4 as new front feature points F1new, new left feature points F3new, and new right feature points F4new, respectively. At this time, the vehicle parking assist apparatus 10 may acquire the rear feature points F2 as new rear feature points F2new.

Then, the vehicle parking assist apparatus 10 acquires one or more of the acquired new front feature points F1new from each of the front divided areas 71D as final feature points Ffin. In addition, the vehicle parking assist apparatus 10 acquires one or more of the acquired new left feature points F3new from each of the left divided areas 73D as the final feature points Ffin. In addition, the vehicle parking assist apparatus 10 acquires one or more of the acquired new right feature points F4new from each of the right divided areas 74D as the final feature points Ffin. If the vehicle parking assist apparatus 10 has acquired the new rear feature points F2new, the vehicle parking assist apparatus 10 acquires one or more of the acquired new rear feature points F2new from each of the rear divided areas 72D as the final feature points Ffin.

<Registration of Parking Lot Information>

When the vehicle parking assist apparatus 10 completes parking the vehicle 100 in the parking lot 62 by the parking assist control, the vehicle parking assist apparatus 10 terminates displaying the camera image 51C on the display 50 and displays the plane view image 51P, the registering button image 55, the displacing button image 57, and the angle adjusting button image 58 on the display 50 as shown in FIG. 10C.

The driver can displace the parking area line image 52 on the display 50 by applying the touch interaction to the displacing button image 57 before the driver applies the touch interaction to the registering button image 55. The driver can change the position of the parking area 61 to a position in which the driver desires to park the vehicle 100 by displacing the parking area line image 52 on the display 50. In addition, the driver can turn the parking area line image 52 on the display 50 by applying the touch interaction to the angle adjusting button image 58 before the driver applies the touch interaction to the registering button image 55. The driver can change the position of the parking area 61 to a position in which the driver desires to park the vehicle 100 by turning the parking area line image 52 on the display 50.

When the driver applies the touch interaction to the registering button image 55, the vehicle parking assist apparatus 10 acquires the coordinates XY of the acquired final feature points Ffin in a registration coordinate system Creg and registers or memorizes the acquired coordinates XY as registration inside coordinates XYin_reg. In addition, the vehicle parking assist apparatus 10 acquires the luminance pattern information CT of the acquired final feature points Ffin and registers or memorizes the acquired luminance pattern information CT as registration inside luminance pattern information CTin_reg. The registration coordinate system Creg is a coordinate system in which a predetermined point Preg is the origin (see FIG. 18). The vehicle 100 includes a shaft connecting a left rear wheel and a right rear wheel to each other. The predetermined point Preg is a center point of the shaft in the vehicle lateral direction Dy when parking the vehicle 100 in the registration target parking area 61 set by the parking assist control is completed. Therefore, the registration inside coordinates XYin_reg indicate the positions of the final feature points Ffin relative to the predetermined position Preg.

In addition, the vehicle parking assist apparatus 10 converts the preliminary midway coordinates XYmid_pre to the coordinates XY in the registration coordinate system Creg and registers or memorizes the converted coordinates XY as the registration inside coordinates XYin_reg. In addition, the vehicle parking assist apparatus 10 registers or memorizes the preliminary midway luminance pattern information CTmid_pre as the registration inside luminance pattern information CTin_reg. Therefore, the registration inside coordinates XYin_reg indicate the positions of the midway feature points Fmid relative to the predetermined position Preg.

The registration inside information Iin_reg includes the registration inside coordinates XYin_reg and the registration inside luminance pattern information CTin_reg.

In addition, the vehicle parking assist apparatus 10 registers or memorizes the coordinates XY of the registration target parking area 61 set in the registration coordinate system Creg as registration area coordinates XYarea_reg. The registration area coordinates XYarea_reg indicate the position of the parking area 61 relative to the predetermined position Preg. The registration area information Iarea_reg includes the registration area coordinates XYarea_reg In addition, the vehicle parking assist apparatus 10 converts the preliminary entrance coordinates XYent_pre to the coordinates XY in the registration coordinate system Creg and registers or memorizes the converted coordinates XY as registration entrance coordinates XYent_reg. In addition, the vehicle parking assist apparatus 10 registers or memorizes the preliminary entrance luminance pattern information CTent_pre as the registration entrance luminance pattern information CTent_reg. Therefore, the registration entrance coordinates XYent_reg indicate the positions of the entrance feature points Fent relative to the predetermined position Preg. The registration entrance information Ient_reg includes the registration entrance coordinates XYent_reg and the registration entrance luminance pattern information CTent_reg.

As described above, the parking lot information Ipark includes the registration entrance information Ient_reg, the registration inside information Iin_reg, and the registration area information Iarea_reg.

<Parking Vehicle in Registered Parking Lot>

Figures 19A, 19B, 19C:
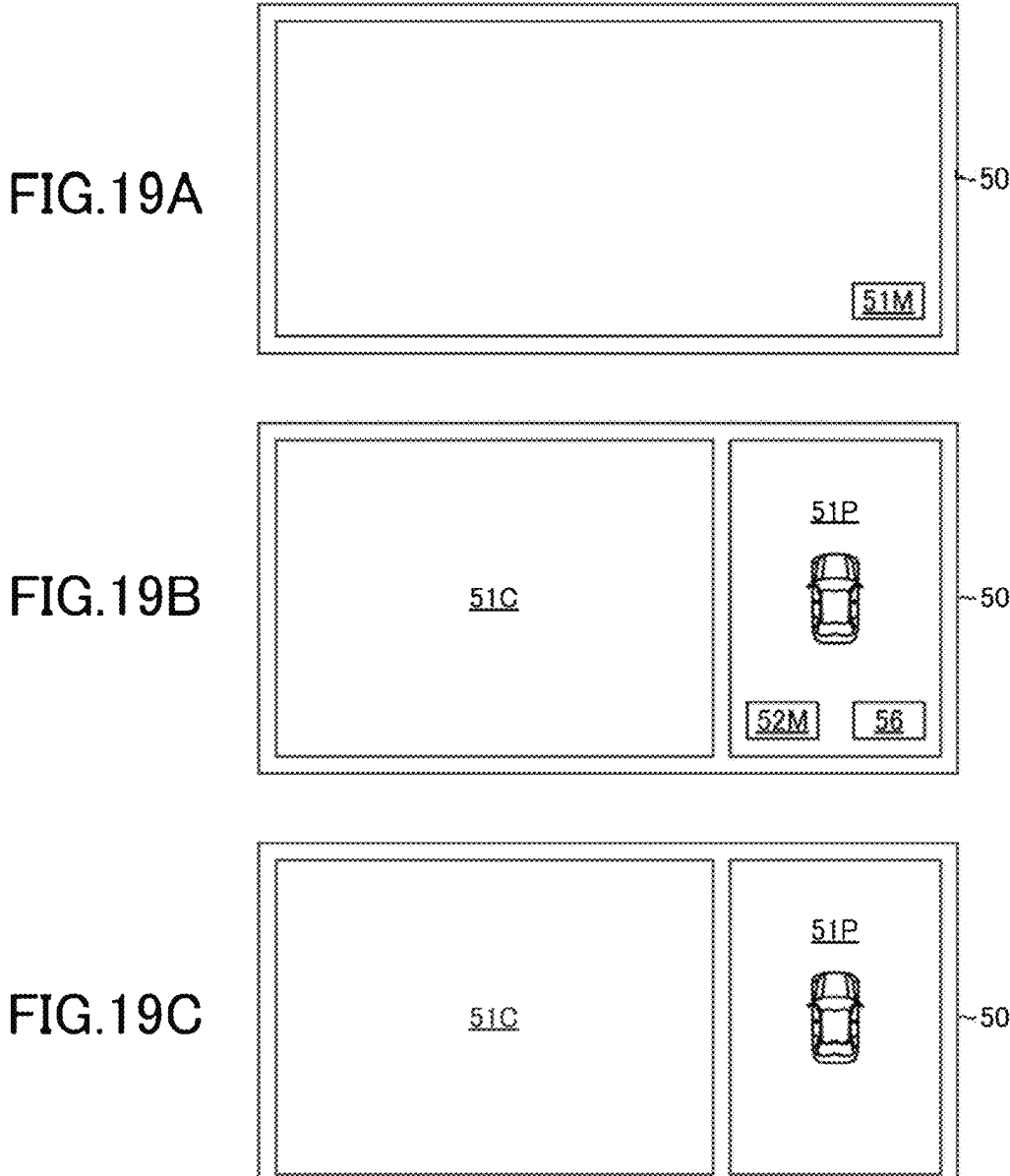
FIG. 19A to FIG. 19C are views which show the displays.

When (i) the vehicle parking assist apparatus 10 determines that the vehicle 100 stops by the entrance 62ent of the parking lot 62, (ii) the vehicle parking assist apparatus 10 determines that the parking lot 62 in question is the registered parking lot, and (iii) the driver applies the touch interaction to the parking assist switch image 51M displayed on the display 50 as shown in FIG. 10A, the vehicle parking assist apparatus 10 terminates displaying the parking assist switch image 51M on the display 50 and displays the camera image 51C, the plane view image 51P, the registration main switch image 52M, and the parking start button image 56 on the display 50 as shown in FIG. 19B. In this regard, when the registered parking lot 62 exists at the left side of the vehicle 100, the vehicle parking assist apparatus 10 acquires the image displaying the registered parking lot 62 from the left camera 43 and displays the acquired image on the display 50 as the camera image 51C. In addition, the vehicle parking assist apparatus 10 displays the plane view image 51P on the display 50 such that the parking lot image is displayed at the left side of the vehicle image. On the other hand, when the registered parking lot 62 exists at the right side of the vehicle 100, the vehicle parking assist apparatus 10 acquires the image displaying the registered parking lot 62 from the right camera 44 and displays the acquired image on the display 50 as the camera image 51C. In addition, the vehicle parking assist apparatus 10 displays the plane view image 51P on the display 50 such that the parking lot image is displayed at the right side of the vehicle image.

In addition, the vehicle parking assist apparatus 10 fixes the position of the parking area 61, based on the registration area coordinates XYarea_reg included in the parking lot information Ipark relating to the registered parking lot 62 in which the vehicle parking assist apparatus 10 will park the vehicle 100 this time.

When the driver applies the touch interaction to the parking start button image 56, the vehicle parking assist apparatus 10 terminates displaying the registration main switch image 52M and the parking start button image 56 on the display 50 and continues displaying the camera image 51C and the plane view image 51P on the display 50 as shown in FIG. 19C.

In addition, when the driver applies the touch interaction to the parking start button image 56, the vehicle parking assist apparatus 10 reads out the parking area 61 registered by the parking lot information Ipark and sets a target parking area 61*tgt* to the acquired parking area 61.

In addition, when the driver applies the touch interaction to the parking start button image 56, the vehicle parking assist apparatus 10 sets the target moving route Rtgt along which the vehicle parking assist apparatus 10 moves the vehicle 100 to park the vehicle 100 in the target parking area 61*tgt*.

Then, the vehicle parking assist apparatus 10 executes a second parking moving process to move the vehicle 100 to the target parking area 61*tgt* along the target moving route Rtgt. The second parking moving process is a process to control the operations of the vehicle driving force generation apparatus 11, the brake apparatus 12, and the steering apparatus 13 to move the vehicle 100 along the target moving route Rtgt, based on (i) the image information IMG, (ii) the object information OBJ, (iii) the steering angle θst, (iv) the steering torque TQst, (v) the vehicle moving speed SPD, (vi) the vehicle yaw rate YR, (vii) the vehicle longitudinal acceleration Gx, and (viii) the vehicle lateral acceleration Gy.

While the vehicle parking assist apparatus 10 executes the second parking moving process to move the vehicle 100 along the target moving route Rtgt, the vehicle parking assist apparatus 10 executes a safety determination process to determine whether the vehicle parking assist apparatus 10 can move the vehicle 100 safely to the target parking area 61*tgt*, preventing the vehicle 100 from contacting to the standing object in the parking lot 62. When the vehicle parking assist apparatus 10 determines that the vehicle parking assist apparatus 10 cannot move the vehicle 100 safely to the target parking area 61*tgt*, the vehicle parking assist apparatus 10 corrects the target moving route Rtgt such that the vehicle parking assist apparatus 10 can move the vehicle 100 safely to the target parking area 61*tgt*, preventing the vehicle 100 from contacting to the standing object in the parking lot 62. The vehicle parking assist apparatus 10 executes the safety determination process, based on the image information IMG and the object information OBJ which the vehicle parking assist apparatus 10 acquires during the execution of the second parking moving process.

While the vehicle parking assist apparatus 10 executes the second parking moving process, the vehicle parking assist apparatus 10 executes a searching process to search the camera image CMR to find image parts having the same luminance patterns as the luminance patterns of the registration feature points Freg. The vehicle parking assist apparatus 10 executes the searching process, using the rear image information IMG2, the left image information IMG3, and the right image information IMG4. The registration feature point Fent is the feature point F having the luminance pattern registered as the registration inside luminance pattern information CTin_reg by the parking assist control.

When the vehicle parking assist apparatus 10 finds the image parts in the camera image CMR, the vehicle parking assist apparatus 10 compares or matches the relationship in position between the found image parts with the relationship in position between the registration feature points Freg having the luminance patterns corresponding to the luminance patterns of the found image parts.

When the relationship in position between the found image parts matches the relationship in position between the registration entrance feature points Fent_reg having the luminance patterns corresponding to the luminance patterns of the found image parts, the vehicle parking assist apparatus 10 executes a parking position determination process to determine whether the position of the target parking area 61tgt in the parking lot 62 corresponds to the position indicated by the registration area coordinates XYarea_reg, based on a relationship between the registration area coordinates XYarea_reg and the coordinates XY of the registration feature points Freg having the same luminance patterns as the luminance patterns of the found image parts. When the vehicle parking assist apparatus 10 determines that the position of the target parking area 61tgt in the parking lot 62 does not correspond to the position indicated by the registration area coordinates XYarea_reg, the vehicle parking assist apparatus 10 corrects the position of the target parking area 61tgt such that the position of the target parking area 61tgt in the parking lot 62 corresponds to the position indicated by the registration area coordinates XYarea_reg. Then, the vehicle parking assist apparatus 10 corrects the target moving route Rtgt such that the vehicle parking assist apparatus 10 can park the vehicle 100 in the target parking area 61tgt having the corrected position.

When the entire vehicle 100 has moved in the target parking area 61tgt, the vehicle parking assist apparatus 10 stops the vehicle 100 and terminates executing the second parking moving process. Thereby, parking the vehicle 100 in the parking lot 62 by the parking assist control is completed.

The summary of the operations of the vehicle parking assist apparatus 10 has been described. According to the vehicle parking assist apparatus 10, the information on the feature points F of the ground 63 in and/or around the parking lot 62, not the feature points of the standing object(s) in and/or around the parking lot 62, is registered as the registration entrance information Ient_reg. The camera image CMR of the ground 63 in and/or around the parking lot 62 varies to a small extent between the time of the registration entrance information Ient_reg being registered and the time of the vehicle 100 arriving at the entrance 62ent of the registered parking lot 62 after the registration entrance information Ient_reg is registered if the situation surrounding the vehicle 100 and the parking lot 62 varies between the time of the registration entrance information Ient_reg being registered and the time of the vehicle 100 arriving at the entrance 62ent of the registered parking lot 62 after the registration entrance information Ient_reg is registered. Therefore, it is possible to assuredly determine that the entrance feature points Fent acquired this time are the registration entrance feature points Fent_reg when the vehicle 100 arrives at the entrance 62ent of the registered parking lot 62 if the situation surrounding the vehicle 100 and the parking lot 62 varies between the time of the registration entrance information Ient_reg having been registered and the time of the vehicle 100 arriving at the entrance 62ent of the registered parking lot 62 this time. As a result, it is possible to assuredly determine that the parking lot 62 at which the vehicle 100 arrives this time is the registered parking lot 62. Thus, the vehicle 100 can be autonomously parked in the registered parking lot 62.

<Specific Operations of Vehicle Parking Assist Apparatus>

Next, specific operations of the vehicle parking assist apparatus 10 will be described. The CPU of the ECU 90 of the vehicle parking assist apparatus 10 is configured or programmed to execute a routine shown in FIG. 20 each time a predetermined time elapses.

Therefore, at a predetermined timing, the CPU starts to execute a process from a step 2000 and then, proceeds with the process to a step 2005 to determine whether a value of a parking assist switch operated flag X1_auto is "1." The value of the parking assist switch operated flag X1_auto is set to "1" when (i) the CPU determines that the vehicle 100 stops by the entrance 62ent of the parking lot 62, (ii) the CPU determines that the parking lot 62 in question is not the registered parking lot, and (iii) the touch interaction is applied to the parking assist switch image 51M. On the other hand, the value of the parking assist switch operated flag X1_auto is set to "0" when parking the vehicle 100 in the parking lot 62 by the parking assist control is completed.

When the CPU determines "Yes" at the step 2005, the CPU proceeds with the process to a step 2010 to determine whether a value of a first parking moving process flag X1_exe is "0." The value of the first parking moving process flag X1_exe is set to "1" when the execution of the first parking moving process is started. On the other hand, the value of the first parking moving process flag X1_exe is set to "0" when the execution of the first parking moving process is terminated.

When the CPU determines "Yes" at the step 2010, the CPU proceeds with the process to a step 2015 to display the camera image 51C, the plane view image 51P, and the registration main switch image 52M on the display 50 (see FIG. 9B). Next, the CPU proceeds with the process to a step 2020 to determine whether a value of a registration main switch operated flag Xmain is "1." The value of the registration main switch operated flag Xmain is set to "1" when the touch interaction is applied to the registration main switch image 52M. On the other hand, the value of the registration main switch operated flag Xmain is set to "0" when parking the vehicle 100 in the parking lot 62 by the parking assist control is completed.

When the CPU determines "No" at the step 2020, the CPU proceeds with the process to a step 2025 to terminate displaying the camera image 51C, the plane view image 51P, and the parking assist switch image 51M on the display 50 and display the parking area selecting image 52S on the display 50 (see FIG. 9C). Next, the CPU proceeds with the process to a step 2030 to determine whether a value of a selection completed flag Xselect is "1." The value of the selection completed flag Xselect is set to "1" when the touch interaction is applied to the parking area selecting image 52S. On the other hand, the value of the selection completed flag Xselect is set to "0" when parking the vehicle 100 in the parking lot 62 by the parking assist control is completed.

Figure 21:
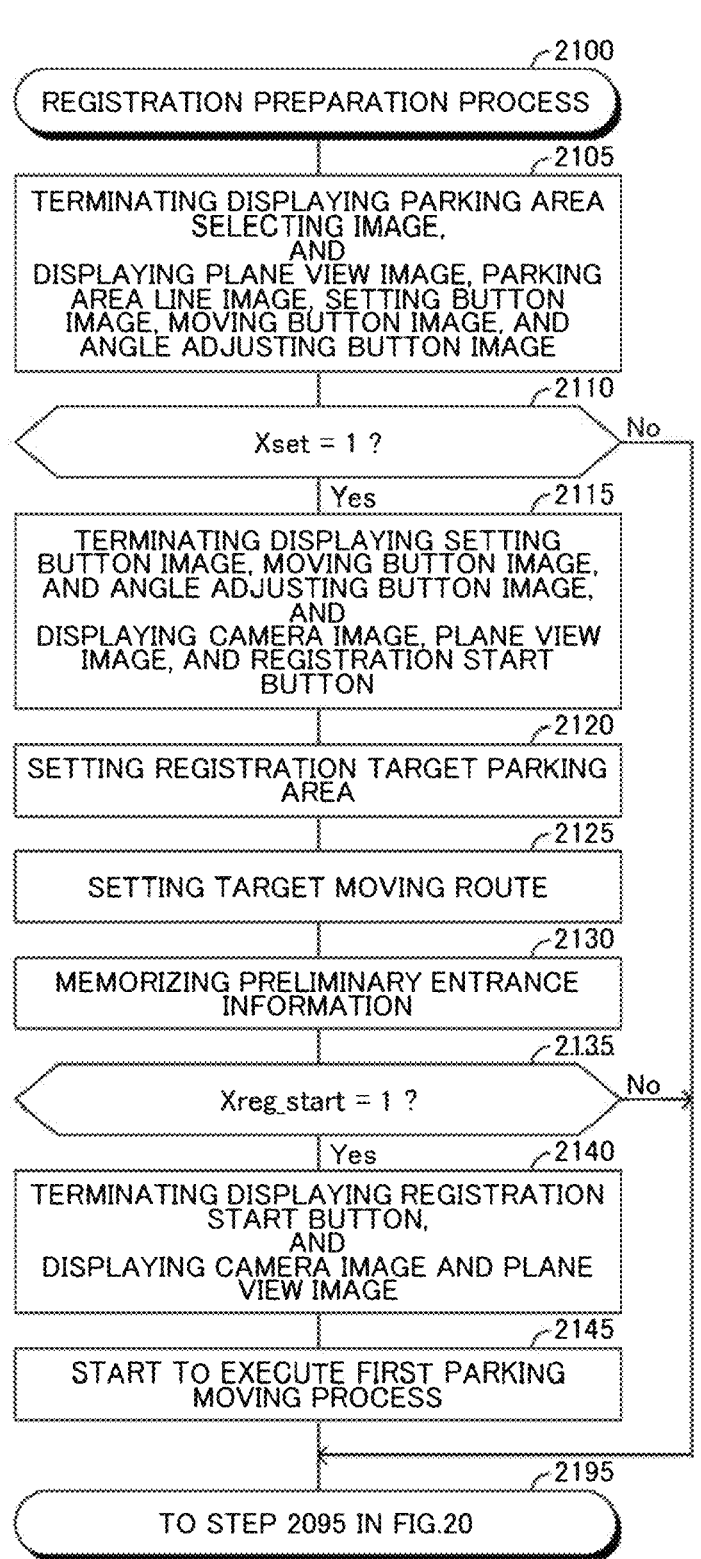
FIG. 21 is a view which shows a flowchart of a routine executed by the CPU.

When the CPU determines "Yes" at the step 2030, the CPU proceeds with the process to a step 2035 to execute a routine shown in FIG. 21. Therefore, when the CPU proceeds with the process to the step 2035, the CPU starts to execute a process from a step 2100 in FIG. 21 and then, proceeds with the process to a step 2105 to terminate displaying the parking area selecting image 52S on the display 50 and display the plane view image 51P, the parking area line image 52, the setting button image 53, the displacing button image 57, and the angle adjusting button image 58 on the display 50 (see FIG. 9D).

Next, the CPU proceeds with the process to a step 2110 to determine whether a value of a setting completed flag Xset is "1." The value of the setting completed flag Xset is set to "1" when the touch interaction is applied to the setting button image 53. On the other hand, the value of the setting completed flag Xset is set to "0" when the execution of the first parking moving process is started.

When the CPU determines "Yes" at the step 2110, the CPU proceeds with the process to a step 2115 to terminate displaying the setting button image 53, the displacing button image 57, and the angle adjusting button image 58 on the display 50 and display the camera image 51C, the plane view image 51P, and the registration start button image 54 on the display 50 (see FIG. 10A). Next, the CPU proceeds with the process to a step 2120 to set the parking area 61 corresponding to the parking area line image 52 as the registration target parking area 61set. Next, the CPU proceeds with the process to a step 2125 to set the target moving route Rtgt to a moving route of the vehicle 100 to the registration target parking area 61set. Next, the CPU proceeds with the process to a step 2130 to acquire the preliminary entrance information Ient_pre as described above and memorize the acquired preliminary entrance information Ient_pre in the RAM.

Next, the CPU proceeds with the process to a step 2135 to determine whether a value of a registration start flag Xreg_start is "1." The value of the registration start flag Xreg_start is set to "1" when the touch interaction is applied to the registration start button image 54. On the other hand, the value of the registration start flag Xreg_start is set to "0" when the execution of the first parking moving process is started.

When the CPU determines "Yes" at the step 2135, the CPU proceeds with the process to a step 2140 to terminate displaying the registration start button image 54 on the display 50 and display the camera image 51C and the plane view image 51P on the display 50 (see FIG. 10B). Next, the CPU proceeds with the process to a step 2145 to start to execute the first parking moving process to move the vehicle 100 to the registration target parking area 61 set along the target moving route Rtgt. Next, the CPU proceeds with the process to a step 2095 in FIG. 20 via a step 2195 to terminate executing this routine once.

Figure 20:
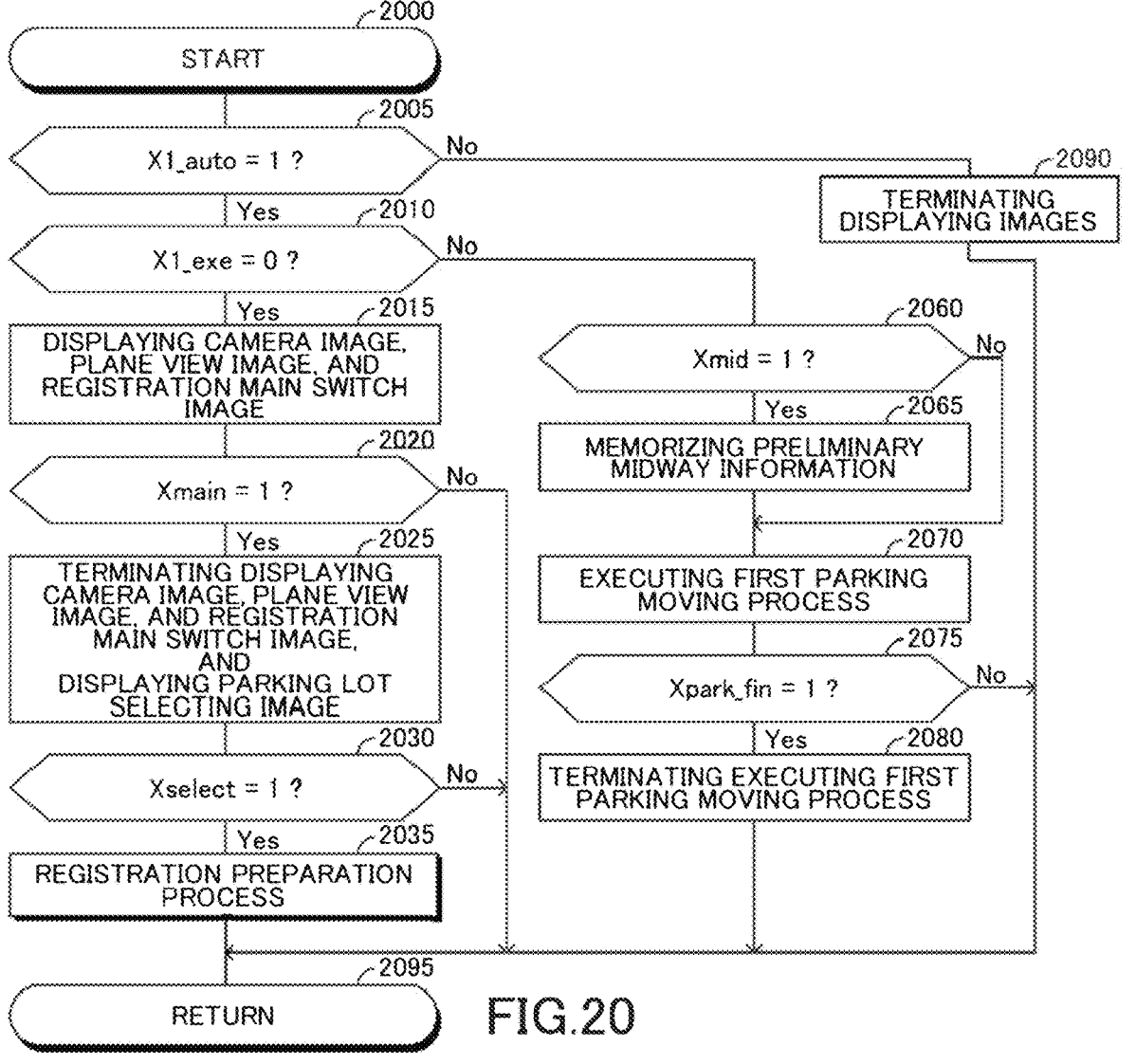
FIG. 20 is a view which shows a flowchart of a routine executed by a CPU of an ECU shown in FIG. 1.

On the other hand, when the CPU determines "No" at the step 2135, the CPU proceeds with the process to the step 2095 in FIG. 20 via the step 2195 to terminate executing this routine once.

Also, when the CPU determines "No" at the step 2120, the CPU proceeds with the process to the step 2095 in FIG. 20 via the step 2195 to terminate executing this routine once.

Further, when the CPU determines "No" at the step 2030 in FIG. 20, the CPU proceeds with the process to the step 2095 to terminate executing this routine once.

Also, when the CPU determines "No" at the step 2020, the CPU proceeds with the process to the step 2095 to terminate executing this routine once.

When the CPU determines "No" at the step 2010, the CPU proceeds with the process to a step 2060 to determine whether a value of a midway information acquiring flag Xmid is "1." The value of the midway information acquiring flag Xmid is set to "1" when the CPU predicts that the vehicle 100 continues moving rearward straight without turning until the CPU completes parking the vehicle 100 in the parking lot 62 by the parking assist control. On the other hand, the value of the midway information acquiring flag Xmid is set to "0" when an execution of a process of a step 2065 is completed.

When the CPU determines "Yes" at the step 2060, the CPU proceeds with the process to a step 2065 to acquire the preliminary midway information Imid_pre as described above and memorize the acquired preliminary midway information Imid_pre in the RAM. Next, the CPU proceeds with the process to a step 2070.

On the other hand, when the CPU determines "No" at the step 2060, the CPU proceeds with the process to a step 2070.

When the CPU proceeds with the process to the step 2070, the CPU continues executing the first parking moving process. Next, the CPU proceeds with the process to a step 2075 to determine whether a value of a parking completed flag Xpark_fin is "1." The value of the parking completed flag Xpark_fin is set to "1" when the entire vehicle 100 has moved in the registration target parking area 61set. On the other hand, the value of the parking completed flag Xpark_fin is set to "0" when the execution of the first parking moving process is completed.

When the CPU determines "Yes" at the step 2075, the CPU proceeds with the process to a step 2080 to terminate executing the first parking moving process. Next, the CPU proceeds with the process to the step 2095 to terminate executing this routine once.

On the other hand, when the CPU determines "No" at the step 2075, the CPU proceeds with the process to the step 2095 to terminate executing this routine once.

When the CPU determines "No" at the step 2005, the CPU proceeds with the process to a step 2090 to terminate displaying the plane view image 51P, etc. on the display 50. Next, the CPU proceeds with the process to the step 2095 to terminate executing this routine once.

Figure 22:
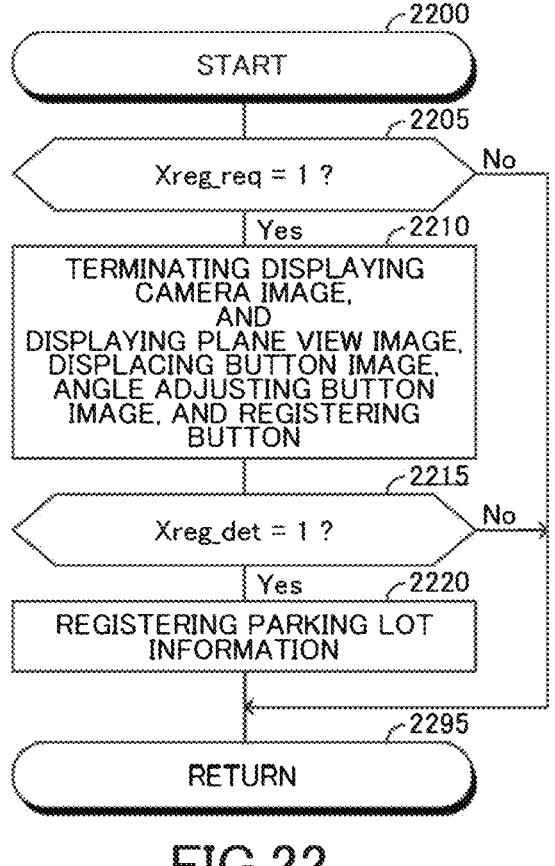
FIG. 22 is a view which shows a flowchart of a routine executed by the CPU.

In addition, the CPU is configured or programmed to execute a routine shown in FIG. 22 each time the predetermined time elapses. Therefore, at a predetermined timing, the CPU starts to execute a process from a step 2200 in FIG. 22 and then, proceeds with the process to a step 2205 to determine whether a value of an information registration request flag Xreg_req is "1." The value of the information registration request flag Xreg_req is set to "1" when parking the vehicle 100 in the parking lot 62 by the first parking moving process is completed. On the other hand, the value of the information registration request flag Xreg_req is set to "0" when the parking lot information Ipark is registered in the RAM.

When the CPU determines "Yes" at the step 2205, the CPU proceeds with the process to a step 2210 to terminate displaying the camera image 51C on the display 50 and display the plane view image 51P, the displacing button image 57, the angle adjusting button image 58, and the registering button image 55 on the display 50 (see FIG. 10C). Next, the CPU proceeds with the process to a step 2215 to determine whether a value of a registration fixed flag Xreg_det is "1." The value of the registration fixed flag Xreg_det is set to "1" when the touch interaction is applied to the registering button image 55. On the other hand, the value of the registration fixed flag Xreg_det is set to "0" when a process of the step 2120 is executed.

When the CPU determines "Yes" at the step 2215, the CPU proceeds with the process to a step 2220 to register the registration entrance information Ient_reg, the registration inside information Iin_reg, and the registration area information Iarea_reg in the RAM as the parking lot information Ipark as described above. Next, the CPU proceeds with the process to a step 2295 to terminate executing this routine once.

On the other hand, when the CPU determines "No" at the step 2215, the CPU proceeds with the process to the step 2295 to terminate executing this routine once.

Also, when the CPU determines "No" at the step 2205, the CPU proceeds with the process to the step 2295 to terminate executing this routine once.

Figure 23:
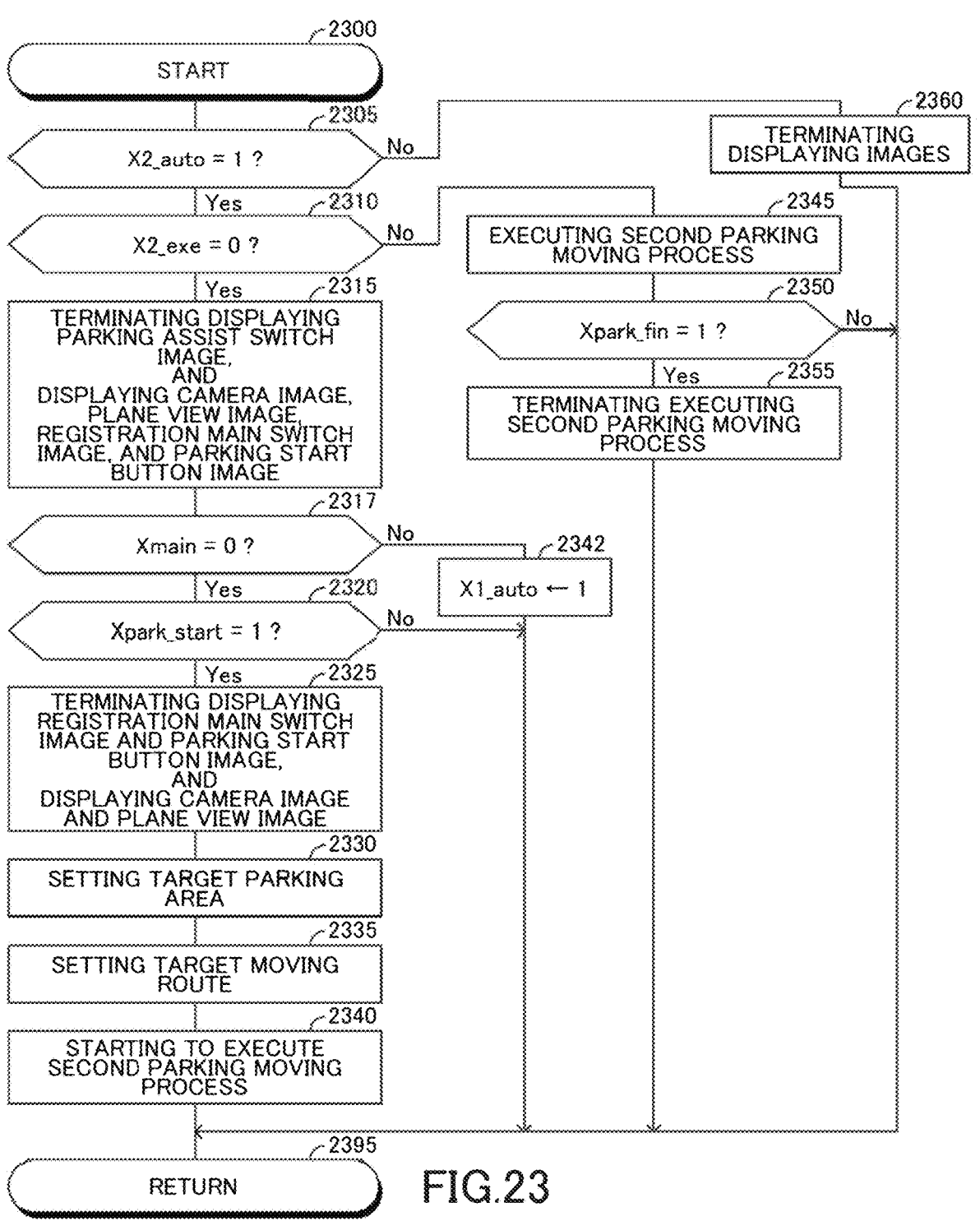
FIG. 23 is a view which shows a flowchart of a routine executed by the CPU.

In addition, the CPU is configured or programmed to execute a routine shown in FIG. 23 each time the predetermined time elapses. Therefore, at a predetermined timing, the CPU starts to execute a process from a step 2300 in FIG. 23 and then, proceeds with the process to a step 2305 to determine whether a value of a parking assist switch operated flag X2_auto is "1." The value of the parking assist switch operated flag X2_auto is set to "1" when (i) the CPU determines that the vehicle 100 stops by the parking lot 62, (ii) the CPU determines that the parking lot 62 in question is the registered parking lot, and (iii) the touch interaction is applied to the parking assist switch image 51M. On the other hand, the value of the parking assist switch operated flag X2_auto is set to "0" when parking the vehicle 100 in the parking lot 62 by the parking assist control is completed.

When the CPU determines "Yes" at the step 2305, the CPU proceeds with the process to a step 2310 to determine whether a value of a second parking moving process flag X2_exe is "0." The value of the second parking moving process flag X2_exe is set to "1" when an execution of the second parking moving process is started. On the other hand, the value of the second parking moving process flag X2_exe is set to "0" when the execution of the second parking moving process is terminated.

When the CPU determines "Yes" at the step 2310, the CPU proceeds with the process to a step 2315 to terminate displaying the parking assist switch image 51M on the display 50 and display the registration main switch image 52M and the parking start button image 56 on the display 50 (see FIG. 19B).

Next, the CPU proceeds with the process to a step 2317 to determine whether a value of a registration main switch operated flag Xmain is "0." The value of the registration main switch operated flag Xmain is set to "1" when the touch interaction is applied to the registration main switch image 52M. On the other hand, the value of the registration main switch operated flag Xmain is set to "0" when parking the vehicle 100 in the parking lot 62 by the parking assist control is completed.

When the CPU determines "Yes" at the step 2317, the CPU proceeds with the process to a step 2320 to determine whether a value of a parking start flag Xpark_start is "1." The value of the parking start flag Xpark_start is set to "1" when the touch interaction is applied to the parking start button image 56. On the other hand, the value of the parking start flag Xpark_start is set to "0" when the execution of the second parking moving process is started.

When the CPU determines "Yes" at the step 2320, the CPU proceeds with the process to a step 2325 to terminate displaying the registration main switch image 52M and the parking start button image 56 on the display 50. Thereby, the CPU continues displaying the camera image 51C and the plane view image 51P on the display 50 (see FIG. 19C). Next, the CPU proceeds with the process to a step 2330 to set the target parking area 61*tgt* to the parking area 61 registered with the parking lot information Ipark. Next, the CPU proceeds with the process to a step 2335 to set the target moving route Rtgt to a moving route to move the vehicle 100 to the target parking area 61*tgt*. Next, the CPU proceeds with the process to a step 2340 to start to execute the second parking moving process. Next, the CPU proceeds with the process to a step 2395 to terminate executing this routine once.

On the other hand, when the CPU determines "No" at the step 2320, the CPU proceeds with the process to the step 2395 to terminate executing this routine once.

When the CPU determines "No" at the step 2317, the CPU proceeds with the process to a step 2342 to set the value of the parking assist switch operated flag X1_auto to "1." Next, the CPU proceeds with the process to the step 2395 to terminate executing this routine once. Thereafter, the CPU determines "Yes" at the step 2005 in FIG. 20.

When the CPU determines "No" at the step 2310, the CPU proceeds with the process to a step 2345 to execute the second parking moving process. Next, the CPU proceeds with the process to a step 2350 to determine whether a value of a parking completed flag Xpark_fin is "1." The value of the parking completed flag Xpark_fin is set to "1" when the entire vehicle 100 has moved in the target parking area 61*tgt*. On the other hand, the value of the parking completed flag Xpark_fin is set to "0" when the execution of the second parking moving process is terminated.

When the CPU determines "Yes" at the step 2350, the CPU proceeds with the process to a step 2355 to terminate executing the second parking moving process. Next, the CPU proceeds with the process to the step 2395 to terminate executing this routine once.

On the other hand, when the CPU determines "No" at the step 2350, the CPU proceeds with the process to the step 2395 to terminate executing this routine once.

When the CPU determines "No" at the step 2305, the CPU proceeds with the process to a step 2360 to terminate displaying the plane view image 51P, etc. on the display 50. Next, the CPU proceeds with the process to the step 2395 to terminate executing this routine once.

The specific operations of the vehicle parking assist apparatus 10 have been described. According to the vehicle parking assist apparatus 10, the information on the feature points F of the ground 63 in and/or around the parking lot 62, not the feature points of the standing object(s) in and/or around the parking lot 62, is registered as the registration entrance information Ient_reg (see the step 2220 in FIG. 22). Therefore, it is possible to assuredly determine that the entrance feature points Fent acquired this time are the registration entrance feature points Fent_reg when the vehicle 100 arrives at the entrance 62ent of the registered parking lot 62 if the situation surrounding the vehicle 100 and the parking lot 62 varies between the time of the registration entrance information Ient_reg having been registered and the time of the vehicle 100 arriving at the entrance 62ent of the registered parking lot 62 this time. As a result, it is possible to assuredly determine that the parking lot 62 at which the vehicle 100 arrives this time is the registered parking lot 62. Thus, the vehicle 100 can be autonomously parked in the registered parking lot 62.

It should be noted that the invention is not limited to the aforementioned embodiments, and various modifications can be employed within the scope of the invention.

What is claimed is:

1. A vehicle parking assist apparatus comprising an electronic control unit which can execute a parking assist control to autonomously park a vehicle in a parking lot by using images taken by at least one camera mounted on the vehicle to take the images of views surrounding the vehicle, wherein:

the electronic control unit is configured to:

memorize features of a ground at a position of starting to execute the parking assist control as parking lot information;

determine whether the features of the ground surrounding the vehicle are already memorized as the parking lot information, based on the features of the ground surrounding the vehicle and the features of the ground memorized as the parking lot information; and start to execute the parking assist control, using the memorized parking lot information when the electronic control unit determines that the features of the ground surrounding the vehicle are already memorized as the parking lot information.

2. The vehicle parking assist apparatus as set forth in claim 1, wherein:

the electronic control unit is configured to:

divide an image, of the images, into predetermined divided areas; and acquire at least one feature point as an entrance feature point from each of the predetermined divided areas; and register entrance feature point information on the acquired entrance feature points as the parking lot information.

3. The vehicle parking assist apparatus as set forth in claim 2, wherein the predetermined divided areas have the same sizes.

4. The vehicle parking assist apparatus as set forth in claim 2, wherein the predetermined divided areas do not overlap each other.

5. The vehicle parking assist apparatus as set forth in claim 2, wherein the electronic control unit is configured to acquire a larger number of the entrance feature points from the predetermined divided area relatively near the middle of the entrance of the parking lot than the predetermined divided area relatively away from the middle of the entrance of the parking lot.

6. The vehicle parking assist apparatus as set forth in claim 2, wherein:

the electronic control unit is configured to acquire a predetermined number of the entrance feature points from each of the predetermined divided areas; and the electronic control unit is further configured to acquire a larger number of the feature points from the predetermined divided area from which the electric control unit has acquired the predetermined number of the entrance feature points when the electronic control unit cannot acquire the predetermined number of the entrance feature points from one or more of the predetermined divided areas.

7. The vehicle parking assist apparatus as set forth in claim 2, wherein the entrance feature point information includes information on a position of each of the entrance feature points relative to a predetermined position in the parking lot.

8. The vehicle parking assist apparatus as set forth in claim 1, wherein the electronic control unit is configured to execute the parking assist control with using the currently-acquired parking lot information when the electronic control unit determines that the parking lot by the stopped vehicle is not registered as the parking lot information.

9. The vehicle parking assist apparatus as set forth in claim 1, wherein:

the at least one camera includes:

a front camera which takes the image of the view ahead of the vehicle, a rear camera which takes the image of the view behind the vehicle;

a left camera which takes the image of the view at the left side of the vehicle; and a right camera which takes the image of the view at the right side of the vehicle.

* * * * *